United States Patent [19]

Taniguchi et al.

[11] Patent Number: 4,956,661
[45] Date of Patent: Sep. 11, 1990

[54] CAMERA SYSTEM

[75] Inventors: Nobuyuki Taniguchi, Tondabayashi; Masatake Niwa, Sakai; Akira Fujii, Osaka; Takeo Hoda, Sakai; Masaaki Nakai, Nara; Minoru Sekida, Sakai; Masayoshi Sahara, Sennan, all of Japan

[73] Assignee: Minolta Camera Kabushiki Kaisha, Osaka, Japan

[21] Appl. No.: 220,063

[22] Filed: Jul. 15, 1988

Related U.S. Application Data

[62] Division of Ser. No. 43,758, Apr. 29, 1987, Pat. No. 4,763,144, which is a division of Ser. No. 888,600, Jul. 23, 1986, Pat. No. 4,712,904, which is a division of Ser. No. 634,474, Jul. 25, 1984, Pat. No. 4,621,914.

[30] Foreign Application Priority Data

| Jul. 27, 1983 | [JP] | Japan | 58-138129 |
| Jul. 29, 1983 | [JP] | Japan | 58-139600 |
| Aug. 8, 1983 | [JP] | Japan | 58-144547 |
| Aug. 8, 1983 | [JP] | Japan | 58-144549 |
| Aug. 17, 1983 | [JP] | Japan | 58-150572 |
| Jun. 22, 1984 | [JP] | Japan | 59-129572 |
| Jun. 25, 1984 | [JP] | Japan | 59-131452 |
| Jun. 25, 1984 | [JP] | Japan | 59-131453 |

[51] Int. Cl.$^5$ .................. G03B 7/20; G03B 15/05; G03B 17/18
[52] U.S. Cl. .................. 354/412; 354/413; 354/471; 354/145.1; 354/286
[58] Field of Search .......... 354/412, 413, 475, 471, 354/145.1, 286

[56] References Cited

U.S. PATENT DOCUMENTS

| 4,149,795 | 4/1979 | Sakurada et al. | 354/475 |
| 4,401,373 | 8/1983 | Nakai | 354/412 |
| 4,455,068 | 6/1984 | Izuhara | 354/412 |
| 4,477,164 | 10/1984 | Nakai et al. | 354/412 X |
| 4,509,846 | 4/1985 | Nakai et al. | 354/286 X |
| 4,548,488 | 10/1985 | Honda et al. | 354/286 X |
| 4,673,275 | 6/1987 | Nakai et al. | 354/412 |
| 4,755,845 | 7/1988 | Taniguchi et al. | 354/145.1 |
| 4,774,540 | 9/1988 | Taniguchi et al. | 354/286 X |

Primary Examiner—W. B. Perkey
Attorney, Agent, or Firm—Watson, Cole, Grindle & Watson

[57] ABSTRACT

In a camera system having a camera body and at least one camera accessory attachable to the camera body, a plurality of circuit elements are provided in the camera body and in the camera accessory for performing predetermined respective operations. Circuitry in the camera controls the plurality of circuit elements and includes a data bus for connecting the control circuitry with the plurality of circuit elements. The data bus serially sends data from the control circuitry to the plurality of circuit elements and from the plurality of circuit elements to the control circuitry. At least one signal line connects the control circuitry with each of the circuit elements, respectively, for sending clock pulses utilized for synchronizing the data sent through the data bus. A plurality of selecting lines selects, by the control circuitry, which circuit element receives the data from the control circuitry and sends the data to the control circuitry. The control circuitry selects, in accordance with predetermined camera operation, the circuit element which operates through the selecting lines, with the control circuitry receiving data from the selected circuit element through the data bus with pulses through the signal line to calculate data sent to the circuit element according to the predetermined camera operation. The control circuitry sends the calculated data to the selected circuit element through the data bus with pulses through the signal line for operating the circuit element.

8 Claims, 17 Drawing Sheets

Fig. 8
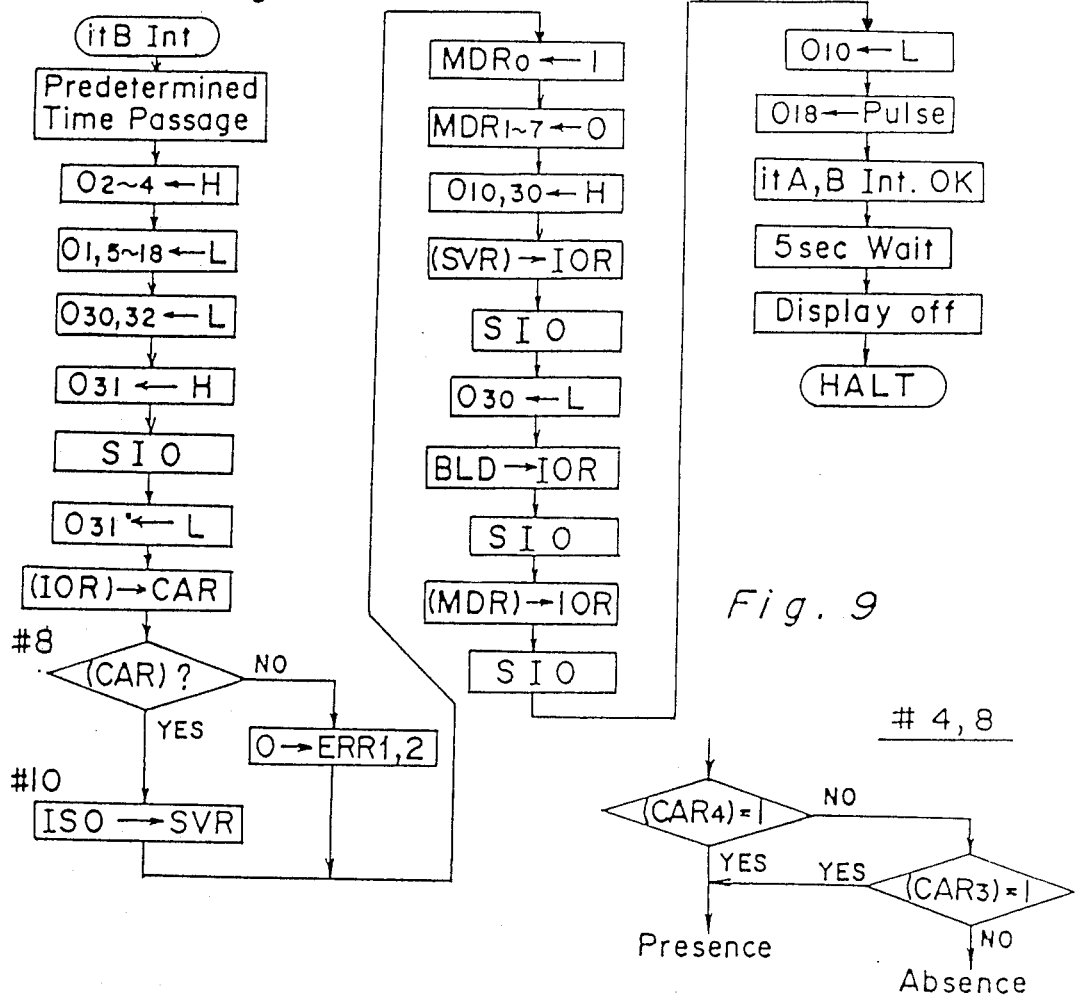
Fig. 9
Fig. 10
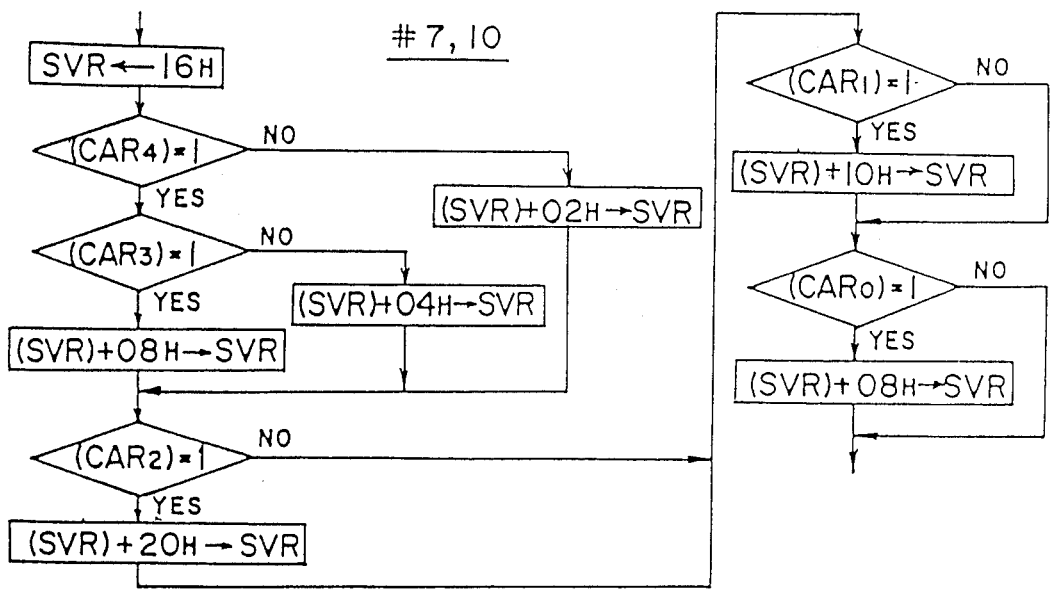

CAMERA SYSTEM

CROSS REFERENCE TO RELATED APPLICATIONS

This is a divisional application of Application Ser. No. 043,758, filed Apr. 29, 1987, now U.S. Pat. No. 4,763,144, which in turn was a divisional application of Application Ser. No. 888,600, filed July 23, 1986, now U.S. Pat. No. 4,712,904, which in turn was a divisional application of Application Ser. No. 634,474, filed July 25, 1984, now U.S. Pat. No. 4,621,914.

BACKGROUND OF THE INVENTION

1. Field of the invention:

The present invention relates to a photographic camera capable of functioning with stored data such as, for example, stored data on the film speed.

2. Description of the Prior Art:

For the purpose of setting the film speed in a photographic camera, it has been proposed to provide a surface of a film cartridge with a code pattern comprised of particular combinations of conductive and non-conductive areas in correspondence with the film speed. When such a film cartridge is loaded in the camera, a plurality of feelers provided in the camera detect such a particular combination of conductive and non-conductive areas to set the film speed automatically in the camera.

SUMMARY OF THE INVENTION

A significant feature of the present invention is both method and apparatus in a camera system having a camera body and at least one camera accessory attachable to the camera body, wherein a plurality of circuit elements are provided in the camera body and in the camera accessory for performing predetermined respective operations and means are provided in the camera body for controlling the plurality of circuit elements. These means include a data bus for connecting the control means with the plurality of circuit elements with the data bus serially sending data from the control means to the plurality of circuit elements and from the plurality of circuit elements to the control means. At least one signal is provided for connecting the control means with each of the circuit elements, respectively, for sending clock pulses utilized for synchronizing the data sent through the data bus. A plurality of selecting lines selects, by the control means, which circuit element receives the data from the control means and sends the data to the control means. The control means selects, in accordance with predetermined camera operation, the circuit element which operates through the selecting lines, the control means receiving data from the selected circuit element through the data bus with pulses through the signal line to calculate data sent to the circuit element according to the predetermined camera operation. The control means sends the calculated data to the selected circuit element through the data bus with pulses through the signal line for operating the circuit element.

A further feature of the invention is that the camera body may be adapted to be attached to a plurality of camera accessories and the control means includes means for sending data received from a circuit element in a camera accessory to a circuit element in another camera accessory. Another significant feature of the invention is that the control means may include means for transmitting data received from a circuit element provided in the camera to another circuit element provided in the camera accessory.

Still another significant feature of the invention is that the control means may include means for transmitting data received from a circuit element provided in the camera body.

Yet another feature of the invention is that the circuit element provided in the camera body includes a circuit for displaying information on the camera body.

Another feature of the invention is that the circuit element provided in the camera accessory includes a circuit provided in an interchangeable lens mountable on the camera body.

A further significant feature of the invention is that the circuit element provided in the camera accessory includes a circuit provided in a flash device attachable to the camera body for illuminating an object to be photographed.

BRIEF DESCRIPTION OF THE DRAWINGS

These and other objects and features of the present invention will become apparent from the following description taken in conjunction with the preferred embodiments thereof in connection with the following drawings, in which:

FIG. 5 is a circuit diagram showing a detail of a circuit CIM of FIG. 4a;

FIG. 6 is a circuit diagram showing a detail of a circuit CAD and a circuit EM of FIG. 4a;

FIG. 8 is a flow chart particularly showing the operation when the back lid is closed;

FIG. 9 is a flow chart showing the detailed steps for step #4 of FIG. 7 or #8 of FIG. 8;

FIG. 10 is a flow chart showing the detailed steps for step #7 of FIG. 7 or #10 of FIG. 8;

FIGS. 14a and 14b plan views of a display employed in the present invention.

DETAILED DESCRIPTION OF THE EMBODIMENT

The present invention will now be described in connection with a preferred embodiment thereof with reference to the accompanying drawings.

Figure 1:
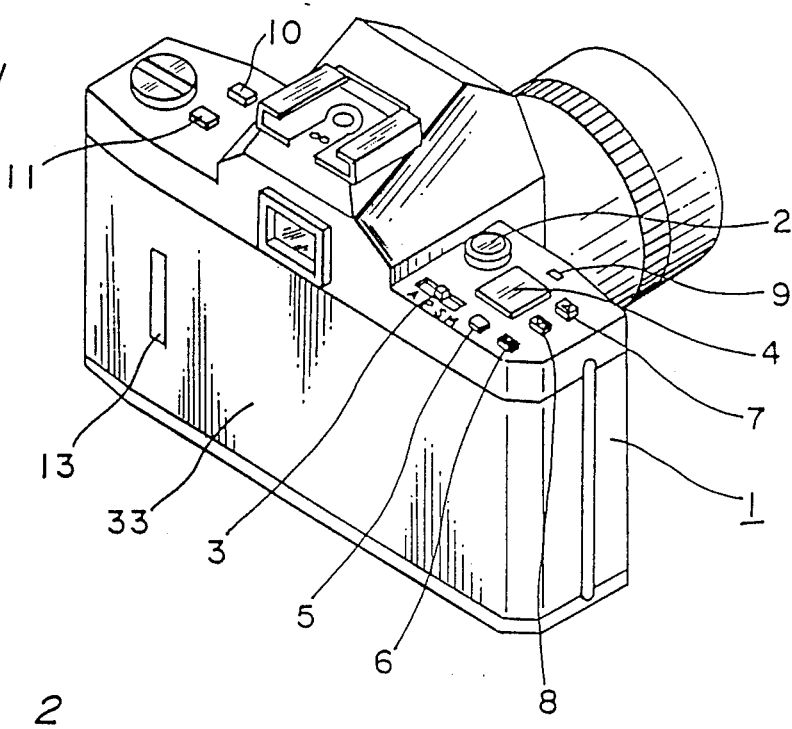
FIG. 1 is a perspective view of a camera system according to a preferred embodiment of the present invention.

Referring first to FIG. 1, a camera body 1 is shown as having a release button 2 which actuates a light measuring switch S1 for instructing a light measurement when it is depressed halfway and actuates a release switch S2 when it is depressed fully for actuating a shutter.

Reference numeral 3 represents a mode change-over switch employed in the form of a slide switch, movable to P, S, M and A positions: P position represents a programmed mode; S position represents an exposure time priority mode in which the aperture is automatically controlled; M position represents a manual mode; and A position represents an aperture priority mode in which the exposure time is automatically controlled. Reference numeral 4 represents a display section for displaying a control exposure time, an aperture value, a film sensitivity, and an override data. An example of the display is shown in FIG. 14.

Reference numeral 5 represents an aperture value setting key, reference numeral 6 represents a shutter speed setting key, and reference numerals 7 and 8 represent up-shift and down-shift keys for changing the value of a selected item, such as aperture value F or shutter speed SS. A counter display window 9 displays the number of film frames photographed.

Reference numeral 10 represents an ISO mode key. When this ISO mode key 10 is depressed, ISO data utilized in the camera body 1 are displayed on the display section 4 and can be changed at any time by means of the up-shift and down-shift keys 7 and 8.

Reference numeral 11 represents an override key. When this override key 11 is depressed, override data are displayed on the display section 4 and can be changed at any time by the manipulation of the up-shift and down-shift keys 7 and 8. Reference numeral 13 represents a film information display window provided in a back cover 13 of the camera body 1.

Figure 2:
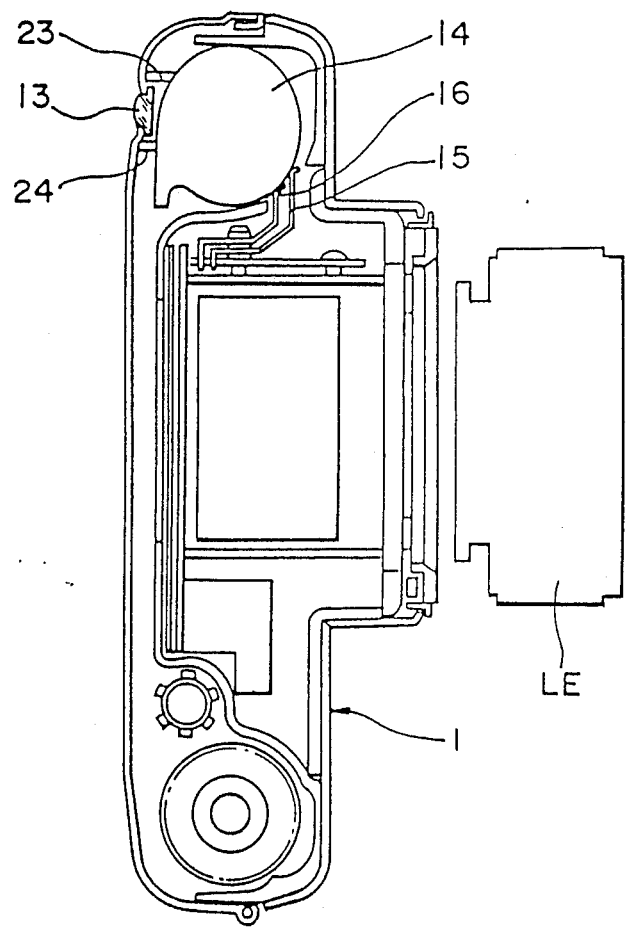
FIG. 2 is a diagrammatic view showing a relationship between a loaded film cartridge and feelers for reading data film cartridge.

Within the camera body 1 shown in FIG. 1, there is provided, as shown in FIG. 2, code read-out feelers 15 and 16 for reading the ISO data provided on a film cartridge 14. These feelers 15 and 16 have a plurality of feeler pieces AT2-AT6, FT8, FT9, FT10, RT11, and RT12 (FIG. 6) adapted to contact code electrodes K1 to K10 formed on the outer peripheral surface of the film cartridge 14, for example, in a matrix of six rows and two columns.

Each of these feeler pieces AT2 to RT12 are fixed by means of vices to a post 18 made of an insulating material and planted within the camera body 1.

Figure 3:
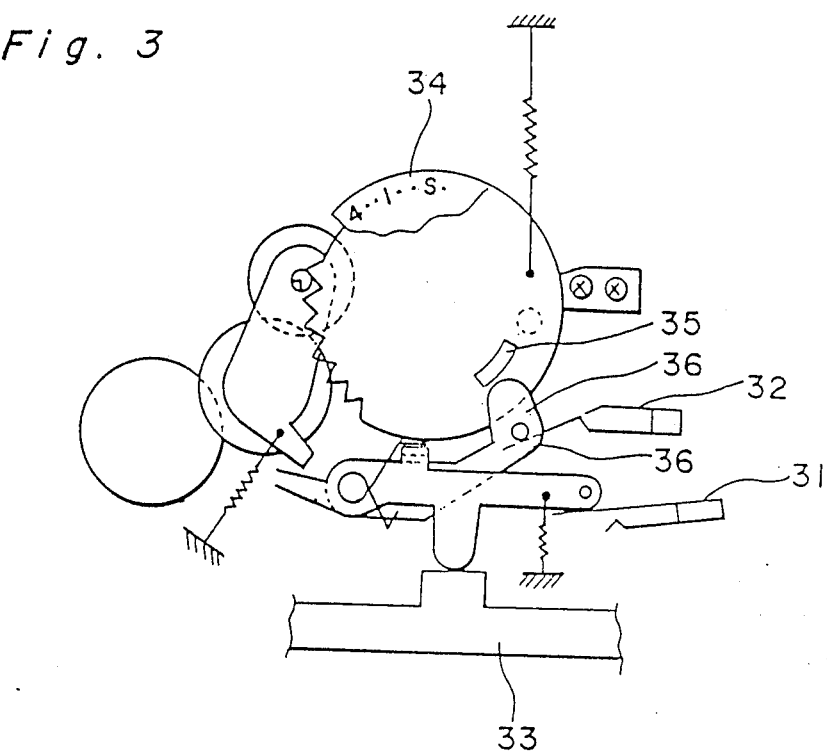
FIG. 3 is a diagrammatic view showing a mechanism of a frame-number counter.

As shown in FIG. 3, within the camera body 1, there is provided a back-lid detecting switch 31 adapted to be opened and closed when a back lid 33 of the camera is closed and opened, respectively, and a counter switch 32 associated with a film counter 34. The counter switch 32 is selectively closed and opened by a lever 36, driven by a cam 35, and is closed when the count of the film counter shows a value within the range of S to 1 and it is opened when it shows a value more than 1.

Figures 4, 4B:
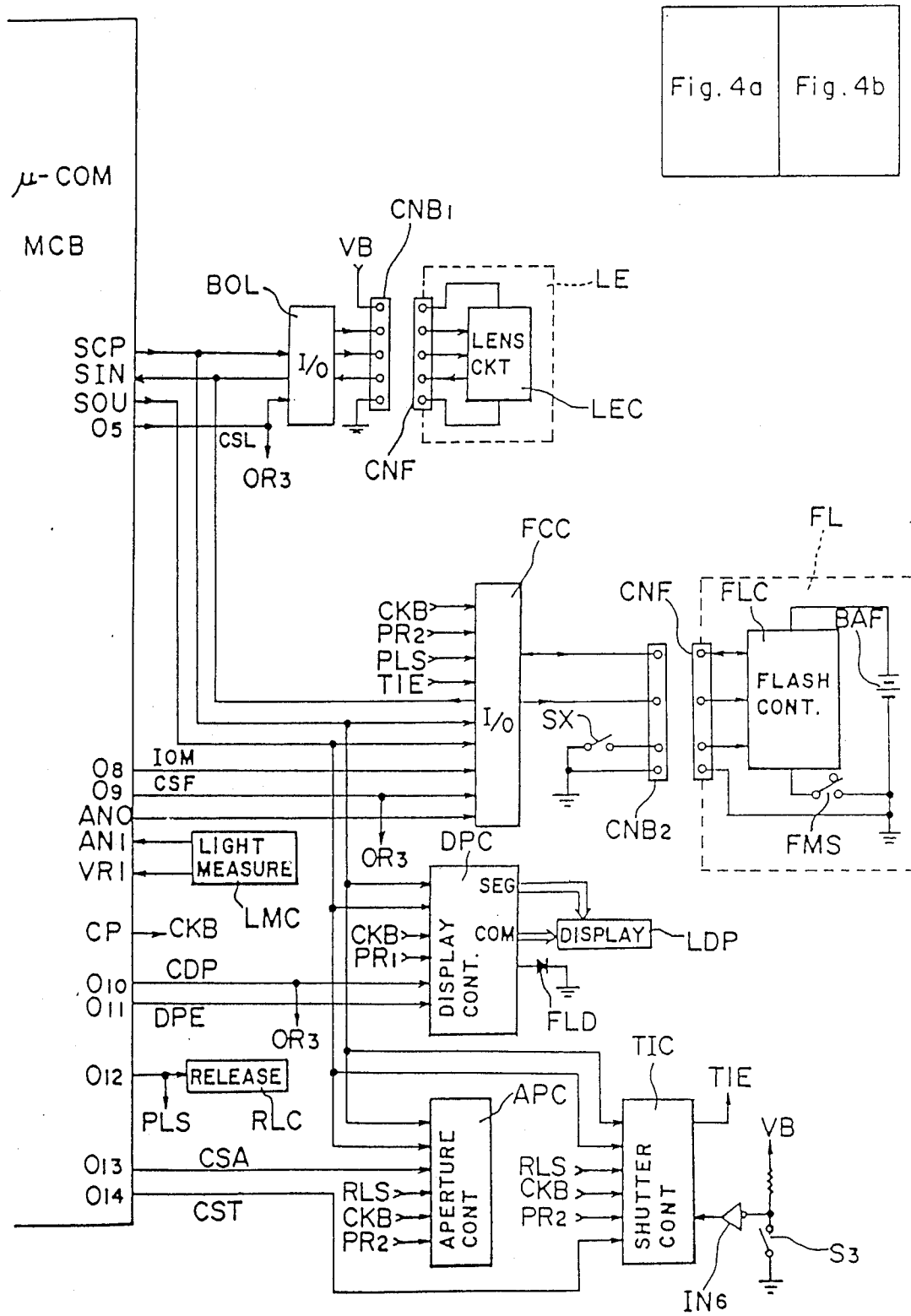
FIGS. 4a and 4b, taken together as shown in FIG. 4, show a circuit diagram employed in the camera system of FIG. 1.

FIG. 4 illustrates a block diagram of the entire camera system embodying the present invention. Reference character PO1 represents a power-on reset circuit provided with a battery power source BAB and adapted to output a power-on reset signal from a terminal PR1 when the supply of electric power from a power line VC is re-initiated.

Reference character MCB represents a microcomputer for controlling the operation of the entire camera system. The operation of this microcomputer MCB is shown in the flow charts of FIGS. 7 to 10 and FIGS. 11a to 11h. Reference numeral S1 represents a light measuring switch adapted to b closed upon the halfway depression of the release button 2. Reference character ISS represents a switch adapted to be closed upon the depression of the ISO mode key, and reference character ORS represents a switch adapted to be closed upon the depression of the override key 11. Reference characters FSS and SSS represent respective switches adapted to be closed upon the depression of the aperture value setting key 5 and the exposure time key 6. Reference characters UPS and DOS represent switches adapted to be closed upon the depression of the up-shift key 7 and the down-shift key 8, respectively. Reference numeral RES represents a switch adapted to be closed upon the depression of a recall button 12. These switches are constituted in a key-matrix with output terminals 02, 03 and 04 and input terminals i1, i2 and i3 of microcomputer MCB, and the one(s) which is(are) closed can be discriminated by microcomputer MCB.

Microcomputer MC is such that, when it is not operated, output terminals 02, 03 and 04 are "High" and a line connected to input terminal i1 is inputted to an interruption terminal itA through an AND circuit AN1, and OR circuit OR1, and AND circuit AN3. Accordingly, when one of the light measuring switch S1, the ISO switch ISS and the override switch ORS is closed, interruption is effected to terminal itA and microcomputer MCB is then started.

Reference character BMS represents a main switch. When this main switch BMS is opened, an inverter IN2 produces "Low", thereby turning the microcomputer in an inoperative position. Furthermore, AND circuit AN3 is held in a disabled state and no interruption signal is inputed to terminal itA, with the microcomputer consequently not started. In addition, when battery BAB is removed to provide no power supply to line VC, AND circuit AN3 is again held in a disabled state, thereby effecting no interruption. Accordingly, when battery BAB is not loaded or when main switch BMB is opened, microcomputer MCB remains in the inoperative position.

Switch S2 is a switch adapted to be closed upon the full depression of release button 2. When this release button switch S2 closes, inverter IN3 produces "High" and an interruption signal is inputed to terminal itA through AND circuit AN2, OR circuit OR1 and AND circuit AN3. When this interruption signal is inputed, and when a shutter charge has completed and the calculation of exposure control data has also completed, an exposure control operation is immediately carried out. It is, however, to be noted that, so long as the microcomputer is carrying out a data exchange with other circuits, OR circuit OR3 produces "High", causing AND circuit AN2 to be disabled. Thus, the interruption by release button switch S2 will not take place.

A switch RCS is a back-lid switch (corresponding to switch 31 in FIG. 3) adapted to be opened and closed when the camera back lid 33 is opened and closed, respectively. Accordingly, when the back lid is closed, the output of an inverter IN4 becomes "High" and a pulse is outputed from a one-shot circuit OS1 to set a flip-flop RF1, with an interruption signal consequently inputed to a terminal itB. Then, microcomputer MCB performs an operation which is to be performed when the back lid is closed. After this operation has been performed, a pulse is outputed from a terminal 018 to reset flip-flop RF1 thereby establishing the inoperative condition.

Reference character LE represents an interchangeable lens assembly which is electrically connected to the camera body through connectors CNF and CNB1 so that fixed data stored in a circuit LEC inside the lens assembly, such as an aperture value, can be serially applied to microcomputer MCB through an interface circuit BOL. This operation causes microcomputer MCB to produce "High" from terminal O5. Then, when a serial-in and serial-out command is executed, eight clock pulses are outputed from a serial clock pulse terminal SCP. In synchronism with these clock pulses, data from the lens assembly LE are inputed and are read in from a serial input terminal SIN. By repeating this serial input command a number of times, necessary data from the lens LE can be all read in.

Reference character CAD represents a code pattern circuit for outputing data of the code pattern provided on the film cartridge 14. Reference character EM represents a code plate for outputing data corresponding to a selected exposure control mode, and reference character SFC represents a counter switch (corresponding to that shown by 32 in FIG. 3) adapted to be closed when the film counter is in a preparatory winding position, but opened when it is in a photo-taking position.

Figure 5:
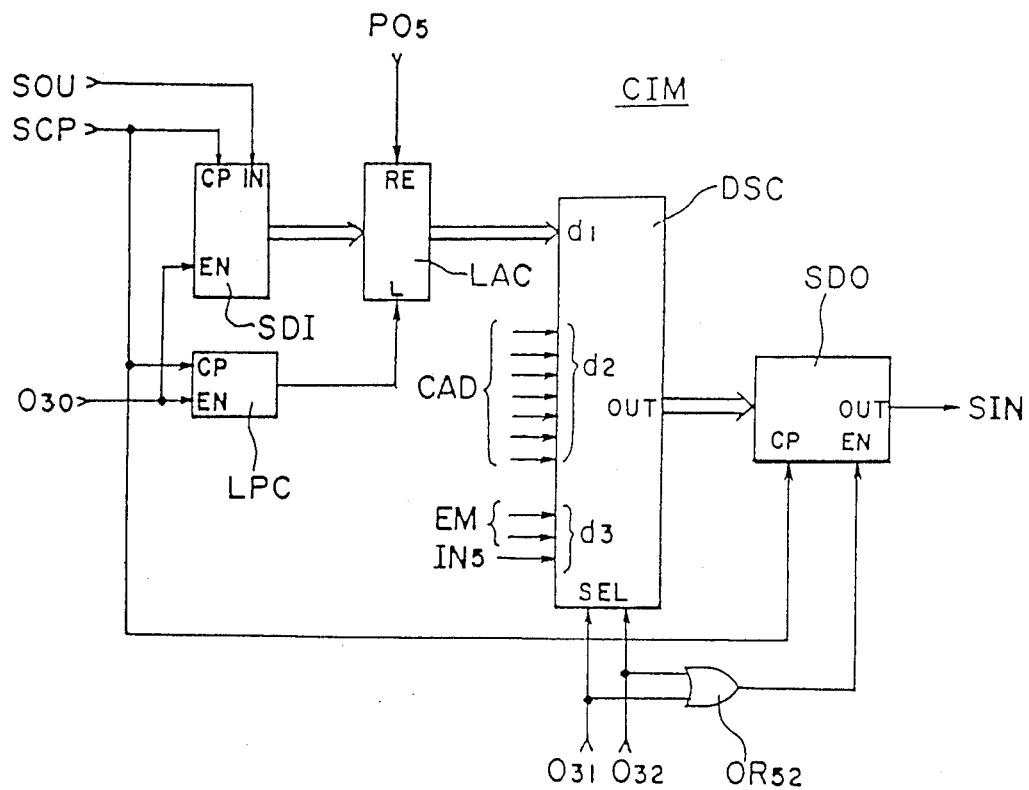

Reference numeral BUB represents a back-up battery. Reference character CIM is a circuit for storing the ISO data, and for reading data CAD from the film cartridge, mode data and a signal from the film counter switch SFC, the details of which are shown in FIG. 5. This circuit CIM is powered by the back-up battery BUB through a diode D21 and is also powered by the main battery BAB through diode D20. Reference character BCC represents a circuit for checking the output voltage of the back-up battery BUB and is powered by a power line VB through a transistor BTO such that, when the output of the back-up battery BUB is higher than a predetermined value, BCC generates a "High" signal to a terminal i20. Reference character PO5 represents a power-on reset circuit capable of outputing a reset signal when the back-up battery is loaded. The reset signal is fed only to an ISO data storage register within the circuit CIM, the content of said register being reset only when the back-up battery BUB is loaded. Terminals O30, O31, O32 are terminals for producing signals that control the operating mode of the circuit CIM. In the circuit CIM, an operation corresponding to output from these terminals takes place. An OR circuit OR50 receives signals from these terminals O30, O31 and O32, and its output terminal is connected to one input terminal of OR circuit OR3. Accordingly, when data transmission is effected between circuit CIM and microcomputer MCB, interruption to terminal itA by release switch S2 is inhibited.

Referring to FIG. 5, reference character SD1 represents a circuit for reading, in synchronism with the clock pulses from a terminal SCP, data which are serially inputed from a terminal SOU of microcomputer MCB. A counter LPC which operates when terminal O30 is "High", counts the number of synchronizing clock pulses when terminal O30 becomes "High", and outputs a latch pulse when it has counted eight clock pulses. This latch pulse is fed to a register LAC and, when this pulse is inputed, data from the reading circuit SD1 are latched. Register LAC is adapted to be reset by a pulse fed from the power-on reset circuit PO5 shown in FIG. 5.

Reference character DSC represents a data selector. Its operation is such that, when the signal from terminals O31 and O32 is "01", ISO data stored in the register LAC, as applied to an input section d1 is produced. When the signal from terminals O31 and O32 is "10", the data on the film container as applied to an input section d2 is produced. When the signal from terminals O31 and O32 is "11", the data of the selected mode and the data of counter switch as applied to an input section d3 are produced. In addition, when the signal from terminals O31 and O32 is "00", the data selector DSC produces no data. A serial data output circuit SDO sequentially serially outputs, when the output of an OR circuit OR52 becomes "High", data from the data selector DSC to terminal SIN on the basis of the synchronizing clock pulses.

Figures 6, 14A, 14B:
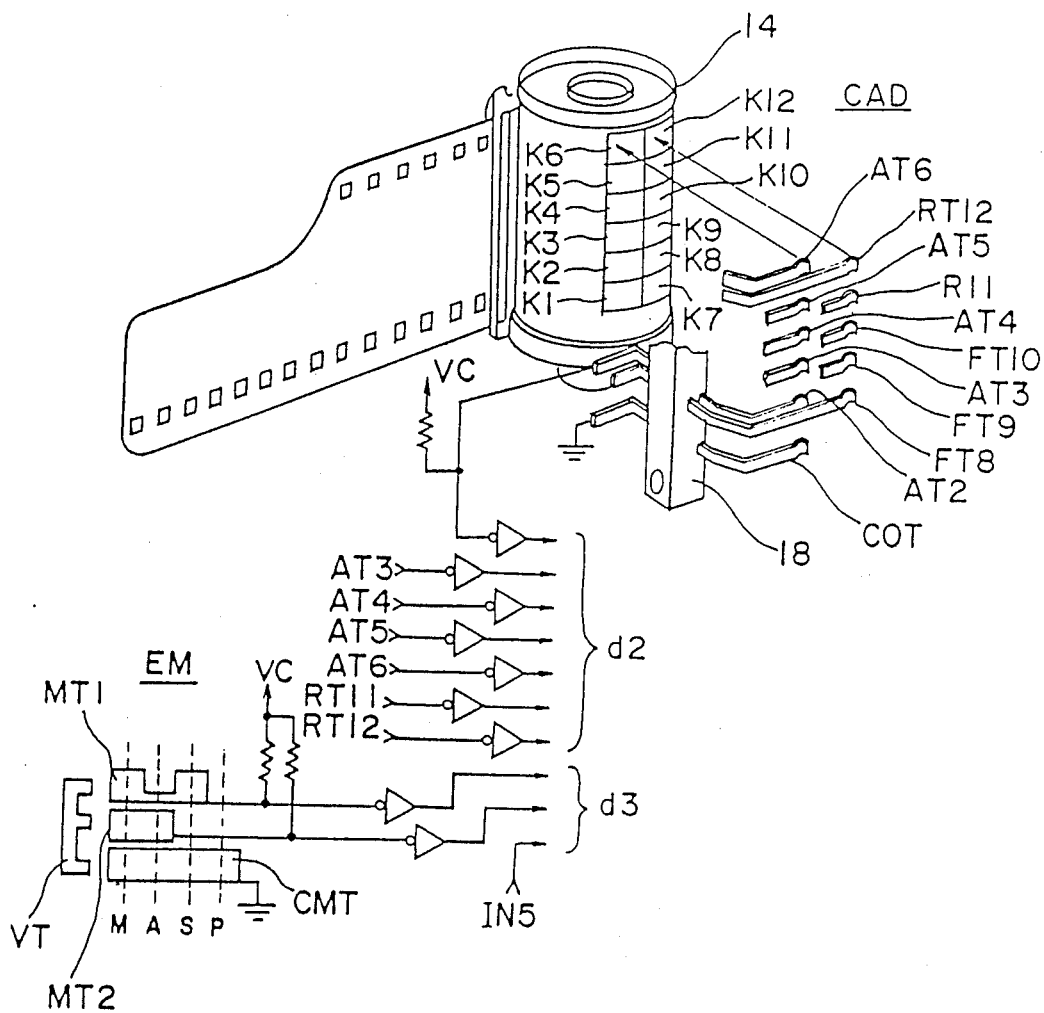

The details of each of CAD and EM are shown in FIG. 6. Referring now to FIG. 6, the film cartridge 14 is provided with code patterns K1 to K12. Portions K1 and K7 are always formed with electrically conductive material regardless of the type of film cartridge and, in the illustrated embodiment, an electrode COT connected to the ground contacts them. Portions K2 to K6 are provided with conductive and non-conductive patterns according to the data corresponding to the ISO sensitivity of a film within the film cartridge 14, an example of which is shown in Table 1.

Contact pieces AT2 to AT6 contact portions K2 to K6, respectively, and are connected to input terminal d2 of data selector DSC, shown in FIG. 5, through pull-up resistors and inverters. Portions K8 to K10 are provided with code patterns corresponding to the data of the number of frames of the film contained in the film cartridge 14. Although contact pieces FT8, FT9 and FT10 contact these portions, data from these contact pieces are inputed nowhere because, in the illustrated embodiment, these data are not utilized.

Portions K11 and K12 are provided with exposure range data.

Contact pieces RT11 and RT12 contact these portions K11 and K12 for supplying data on portions K11 and K12 to input terminal d2 of data selector DSC through pullup resistors and inverters.

Reference characters MT1, MT2 and CMT represent data output code plates for producing data which represents various exposure calculation modes. A slide member VT is moved in accordance with the movement of the mode changeover switch 3. When slide member VT is moved to the P position representing the programmed mode, data "00" are applied to input terminal d2 of data selector DSC. When slide member VT is moved to the S position representing the exposure time priority mode (hereinafter referred to as S mode), data "01" are applied to input terminal d2. When slide member VT is moved to the A position representing the aperture priority mode (hereinafter referred to as A mode), data "10" are applied to input terminal d2. When slide member VT is moved to the M position representing the manual mode, data "11" are applied to input terminal d2. In addition to these data, a signal from film counter switch SFC through an inverter IN5 is also applied to input terminal d2 of data selector DSC.

Referring back to FIG. 4, reference character FL represents a flash device in which a power source battery BAF, a firing and control circuit FLC and a main switch FMS are incorporated. Flash device FL is provided with a connector CNF which, when flash device FL is mounted on the camera body, is electrically connected with a connector CNB2 for effecting signal transmission between the flash device and a control circuit FCC so as to control the flash device.

Reference character LMC represents a light measuring circuit. The result of the light measuring as effected by light measuring circuit LMC is applied to an analog input terminal ANI of the microcomputer. The microcomputer also receives a reference potential for the digital-to-analog conversion to its terminal VR1. Reference character DPC represents a display circuit operable to drive both a liquid crystal display section LDP for the data display and a light emitting diode FLD for the display of flash photography. Display circuit DPC receives display data produced from a terminal SOU during a period in which the output of a terminal O10 is "High" and effects the display based on this data. The details of the display section will be described later in connection with FIG. 12. Reference character RLC represents a release circuit which releases the engagement of an exposure control mechanism based on a pulse from a terminal O12.

Reference character APC represents an aperture control circuit operable to read data of the number of f-stop positions to be stopped down, which are fed from terminal SOU during a period in which a terminal O13 is "High", and to interrupt the stop-down of the aperture of the camera to determine the aperture opening when the data so read coincide with the number of f-stop positions actually stopped down. Reference character TIC represents an exposure time control circuit operable to read exposure time control data outputted from terminal SOU during a period in which a terminal 014 is "High" and to initiate a shutter closing operation after a time corresponding to the data so read has passed since the closure of the count switch S3. Furthermore, a terminal TIE becomes "High" when a release signal RLS is outputed, and becomes "Low" after a predetermined time, for example, 50 millisecond, has passed subsequent to the initiation of the shutter closing operation.

With reference to the flow chart shown in FIG. 7, the operation of this system will now be described. When the power supply is initiated from a terminal VC, the microcomputer MCB is fed with the electric power and performs an initial resetting operation. In addition, by the power-on reset signal PR1, the flip-flop RF1 is reset and the display circuit DPC fed with the electric power from terminal VC is also reset.

Microcomputer MCB produces "High" from terminals O1 to O4 and "Low" from terminals O5 to O18 at step #0. In addition, it produces "High" from terminal O31 and "Low" from terminals O30 and O32 to perform the serial input and output operation. Thereupon, the data on the film cartridge from detector CAD are read in register IOR through circuit CIM which are in turn set in a register CAR. The method of setting the data in register CAR is shown in Table 3.

Subsequently, when microcomputer MCB produces "High" from its output terminal O32, the serial input and output reading is performed, thereby serially reading the ISO data stored in a register LAC. The ISO data so read out are then set in a register MER. Then, a decision is made in order to determine if input terminal i20 is "High". If it is "High", it means that the output voltage of the back-up battery BUB is sufficient. Then, a further decision is made to determine if the data read out from the register LAC are normal. This decision is such that, unless all of the bits are "0", the data so read out are determined normal. Thus, if the back-up battery is normal and the data from the register LAC are normal, data MER read out from the register LAC are set in a register SVR and interruption to terminals itA and itB is enabled with the program flow proceeding to step #3.

On the contrary, if the output voltage of the back-up battery BUB is determined lower than the predetermined value at step #1, or if the result of determination at step #2 indicates that the normal data are not read out from the register LAC, the program flow proceeds to step #4. At step #4, a decision is made in order to determine, by examining the content of register CAR, whether the data from the film cartridge are read in. If the result of the determination is yes, the ISO data based on the data from the film cartridge are set in the register SVR, and if it is no, fixed data (for example, ISO 100 Sv=5) are set in the register SVR. Then, the content of the register SVR are set in an input/output register IOR. Then, terminal O30 produces "High" and, thereafter, the serial input and output reading is performed. Thus, the contents of the register SVR are transferred to a storage register LAC. Subsequently, bits MDR0 and MDR7 are set to be "1" and the remaining bits are set to be "0". Register MDR is the register in which data indicative of display methods are set, the weight of each bit being as follows.

A bit MDR0 is "0" when neither a symbol of ISO nor a symbol of SS is displayed, but becomes "1" when the symbol of ISO or SS is displayed. MDR1 is "1" when the exposure time is to be displayed at the display section, but becomes "0" when the ISO data is displayed. MDR2 and MDR3 are "01" and "10" if override data are on a "+ side" and a "− side", respectively, when the override data is to be displayed. When the override data is 0 and are to be displayed, MDR2 and MDR3 become "11". But, they become "00" when no override data is displayed. Accordingly, when MDR2 and MDR3 are "00", no display concerning the override is effected. When they are "01", a symbol "+/−" of the override is displayed together with "+" preceding the override data; when they are "01", the symbol "+/−" is displayed together with "−" preceding the override data; and when they are "11", the symbol "+/−" is displayed and, at this time, the displayed override data, which is 0, is applied with neither "+" nor "−" preceding such a display "0". It is to be noted that, if MDR2 and MDR3 are "01" and "10", the symbol "+/−" will be displayed even when an exposure control value is displayed.

MDR4 is "1" when an F-value is to be displayed and when "0" it is not displayed. Accordingly, when it is "1", "F" is displayed, but when it is "0", "F" is not displayed. MDR5 and MDR6 are set with a symbol representative of a display manner of the light emitting diode FLD which indicates the state of the flash device. When it is "00", the flash device is not mounted on the camera and the light emitting diode is not lit. When it is "01", it indicates that the flash device is mounted on the camera body and is powered with the electric power and the blinking takes place at the frequency of 2Hz. When it is "10", it indicates that the charging of the flash device has completed with the light emitting diode being lit. When it is "11", it indicates the completion of the light adjustment and, in this case, the light emitting diode FLD blinks at the frequency of 8Hz. MDR7 permits the entire liquid crystal display unit to blink at 2Hz when it is "1", but it is lit continuously when it is "0".

Then, the contents of the register SVR, blank display data BLD, the contents of the register MDR are transferred to the display section DPC and, at the same time, the terminals O1, O2 and O4 produce "Low" to enable the interruption to the terminals itA and itB, and ten seconds is waited for. Accordingly, when the contents of the storage circuit LAC powered by the back-up battery BUB vanish or when the output of the back-up battery BUB is not normal on the occasion when the power source battery BAB for the microcomputer is loaded, the ISO data based on the data on the film cartridge or the fixed ISO data is set, and these data are displayed blinking for ten seconds for the warning. Moreover, since the terminals O2 and O4 are producing "Low", an interruption signal can be applied to terminal itA only when the ISO switch ISS is closed. Accordingly, no exposure control operation is initiated even when the release button is manipulated. In other words, the shutter mechanism is held in a release-locked condition. In order to escape from this condition, the ISO switch should be manipulated o ten seconds should be waited for.

After the passage of ten seconds, the terminals O2 and O4 are produce "High" and terminal O1 produces "Low" at step #3, and thereafter, data necessary to turn of the display are fed to the display section DPC and a "HALT" condition is then resumed. However, it is to be noted that, when the normal ISO data is read out from the register LAC, this data is set and the program flow immediately proceeds to step #3 with no display consequently taking place.

FIG. 8 illustrate the operation that takes place when the interruption signal is inputed to terminal itB as a result of the closure of the back cover. At first, a predetermined time (for example, 0.5 sec.) is waited after the closure of the back cover. This is because, shortly after the back cover has been closed, the film cartridge may undergo a vibratory motion and, therefore, the contact of the feelers 15 and 16 with the film cartridge may not be stabilized. Then, terminals O2, O3 and O4 produce "High" and terminals O1, O5 to O18, O30 and O32 produce "Low". Furthermore, terminal O31 produces "High", and then the serial input and output reading is performed. Accordingly, data are read out from the film cartridge. Subsequently, based on the read data, a decision is made in order to determine if the data is provided on the film cartridge. If the data are provided on the film cartridge, the ISO data based on this data is set in the register SVR, but if it is not provided, the contents of the register SVR remain unchanged.

Thereafter, by rendering the bit MDR0 to be "1" and the remaining bits MDR1 to MDR7 to be "0", the contents of the register SVR, the blank data BLD and the contents of the register MDR are transferred to the display section DPC, thereby displaying the set ISO data. Then, terminal O18 produces a pulse with which the flip-flop RF1 is reset. Then, terminals itA and itB are enabled to receive interruption signals within the next five seconds. After the lapse of the five seconds, the display is turned off with the "HALT" condition established in a manner similar to that effected at step #3.

The details of detection of the presence of CAR at steps #4 or #8 will now be described with reference to FIG. 9. As shown in Table 1, in the case of the film cartridge provided with the code pattern, at least one of the portions K6 and K5 is a conductive portion. If "1" is read in either one of the bits CAR4 and CAR3 of the register CAR, the film cartridge loaded is regarded as having the code pattern, and therefore, the setting of the data from the code pattern is carried out. On the other hand, if both of the bits are "0", it means that the film cartridge having no code pattern is loaded or that no film cartridge is loaded and, in that case, no setting of the data based on the contents of the register is carried out.

The details of the film sensitivity setting operation at steps #7 or #10 will be hereinafter described in connection with FIG. 10. At first, 16H is set in the register SVR, wherein H represents a hexademical number system.

Each of the registers SVR1 and SVR2 has 8 bits, each bit being weighted 16, 8, 4, 2, 1, $\frac{1}{2}$, $\frac{1}{4}$ and $\frac{1}{8}$ from the most significant bit. The film sensitivity is variable by a unit of $\frac{1}{8}$ Ev in terms of APEX value. If a fraction portion of the film sensitivity of the film loaded in the camera is $\frac{1}{8}$ or $\frac{3}{8}$, it is approximated to $\frac{1}{4}$ or $\frac{3}{4}$ ($=\frac{1}{4}+\frac{1}{2}$), respectively. Accordingly, 16H set in the register SVR at step #1 corresponds to Sv=22.

Then, if bits CAR4 and CAR5 of the register CAR are "11", 08H, is added to the contents of the register SVR1. Similarly, if CAR4 and CAR5 are "10", 04H is added, and if they are "01", 02H is added. Accordingly, if the bits of the fraction portion are "11", Sv=1 is added to give 1EH with the fraction portion being $\frac{3}{4}$. On the other hand, if the bits of the fraction portion are "10", Sv=$\frac{1}{2}$ is added to give 1AH with the fraction portion being $\frac{1}{4}$. Furthermore, if the bits are "01", Sv=$\frac{1}{4}$ is added to 18H with the fraction portion being 0.

Subsequently, if the bit CAR2 of the register CAR is 1, Sv=4 is added to the contents of the register SVR1. Similarly, if the bit CAR1 of the register CAR is 1, Sv=2 is added, and if the bit CAR0 is 1, Sv=1 is added.

The foregoing operation will now be described in connection with the case in which the film cartridge of ISO400 is loaded in the camera. In this case, as shown in Table 1, the portions K4 and K5 are conductive. In the register CAR, the bits CAR3 and CAR2 are "1" while the bits CAR4, CAR1 and CAR0 are "0". Then, 22H is added to the register SVR to give 38H. This data will become 4+2+1=7 according to the weighting system of each bit, which corresponds to the APEX value Sv=7 at ISO400.

Figure 11A:
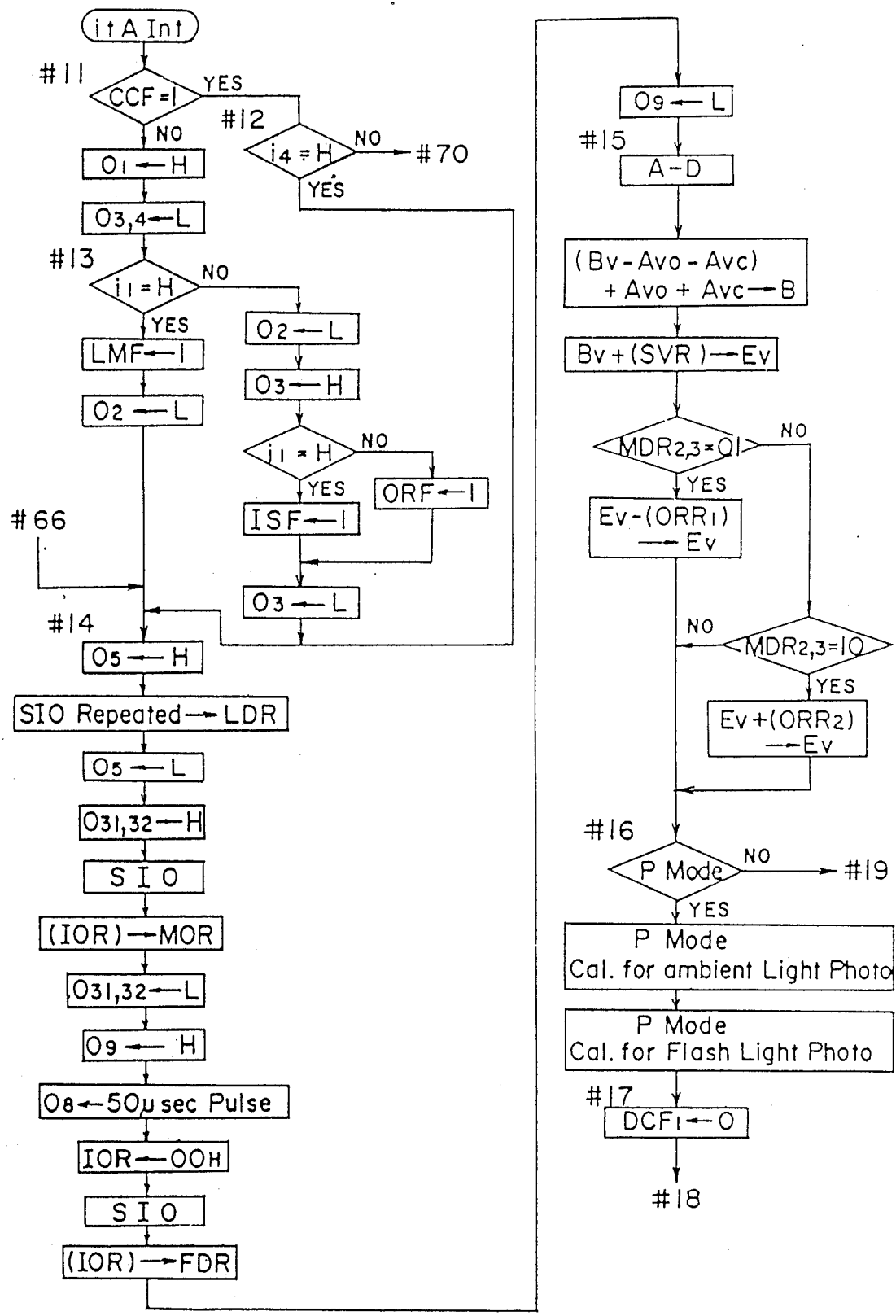
FIGS. 11a to 11h show a flow chart for the camera control under various operating modes.
Figure 11B:
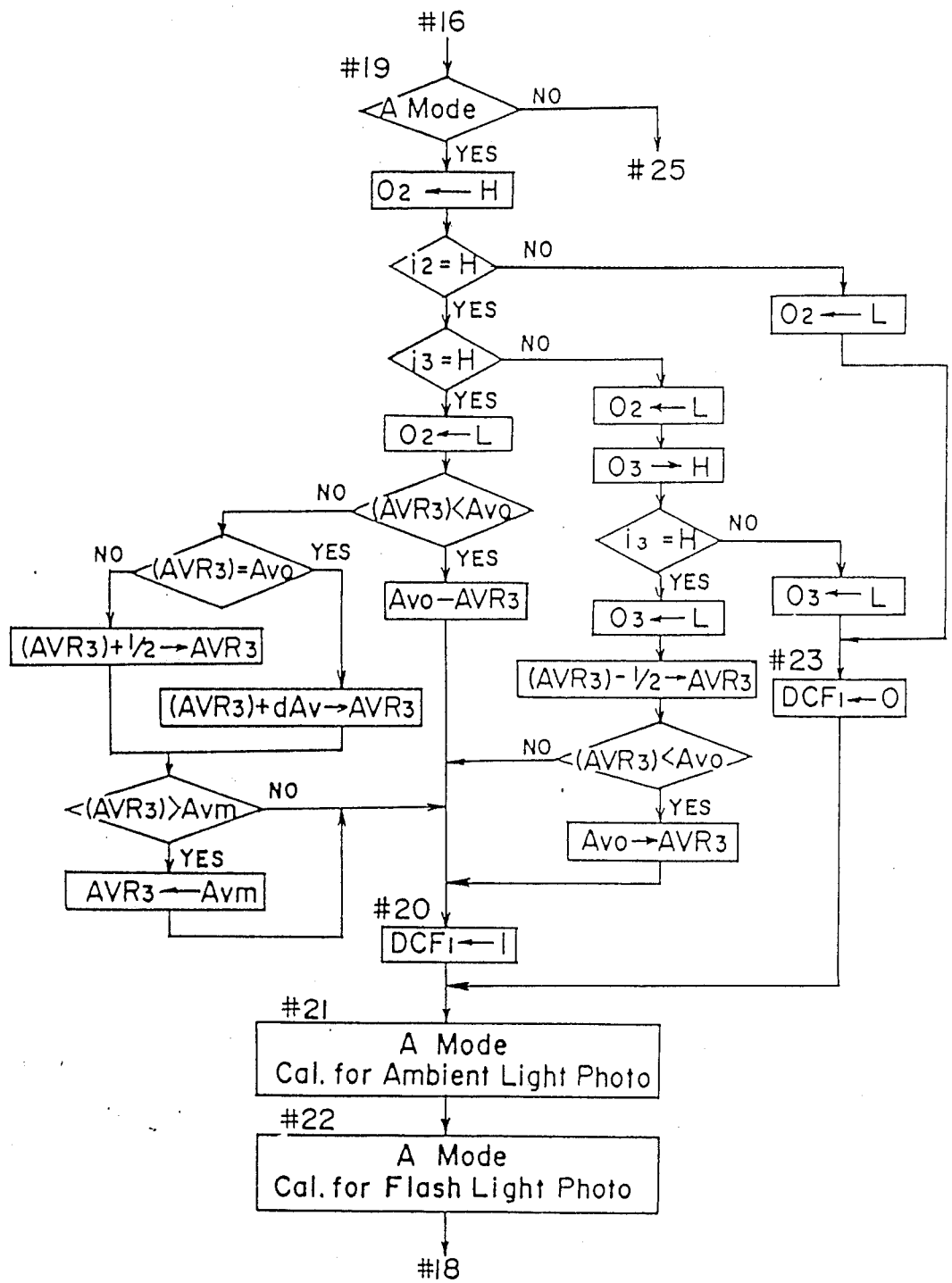
Figure 11C:
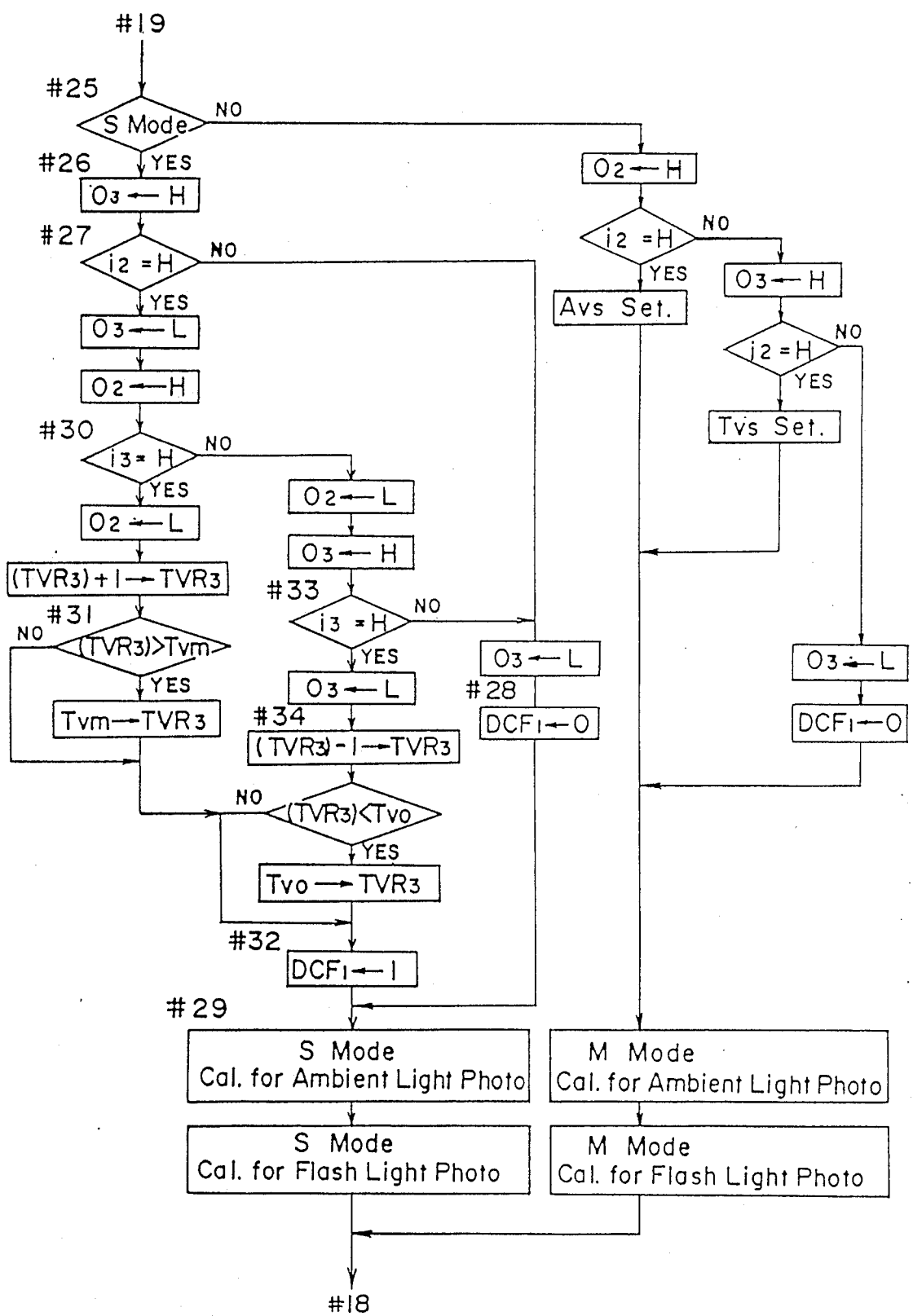
Figure 11D:
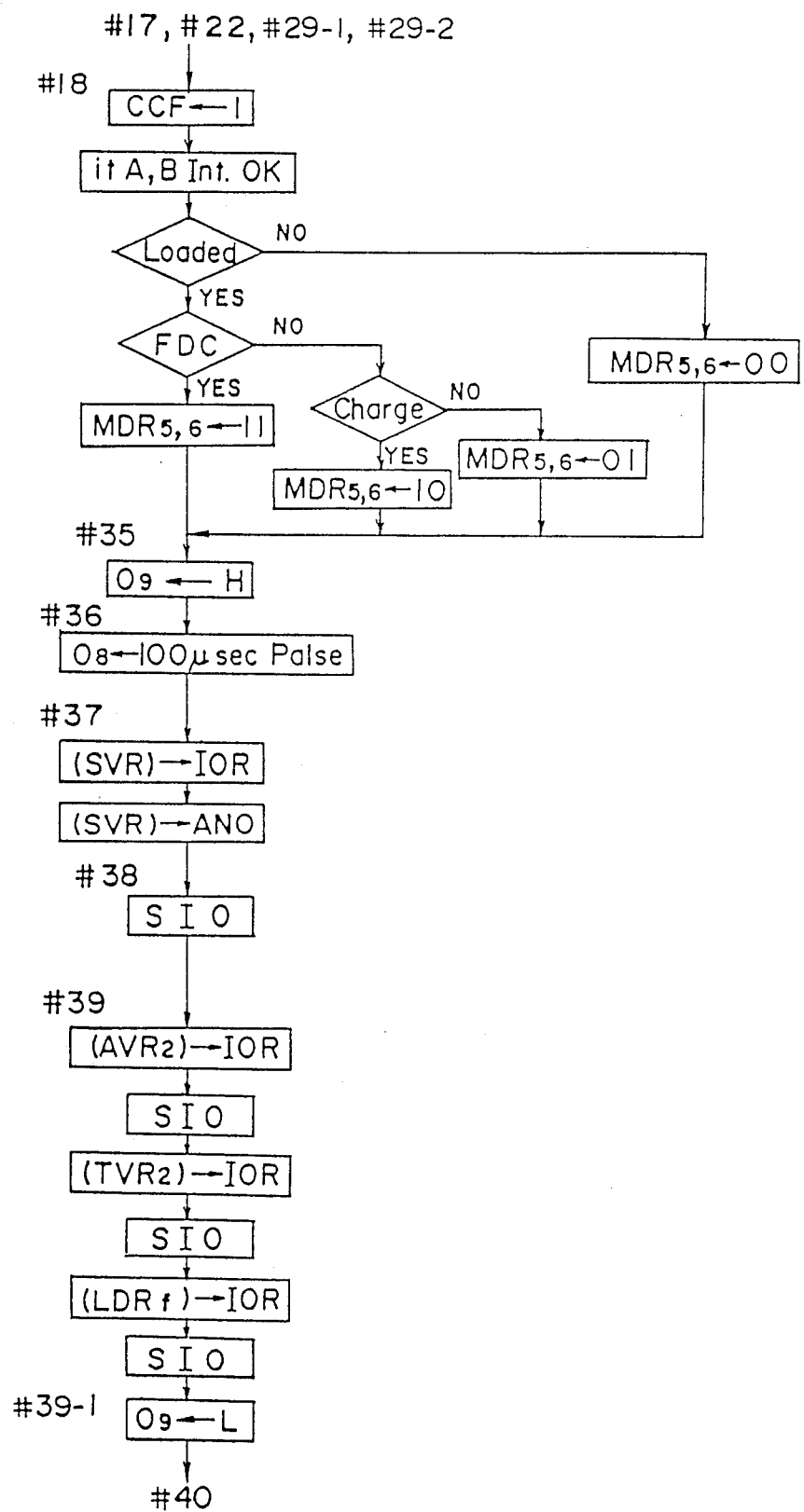
Figure 11E:
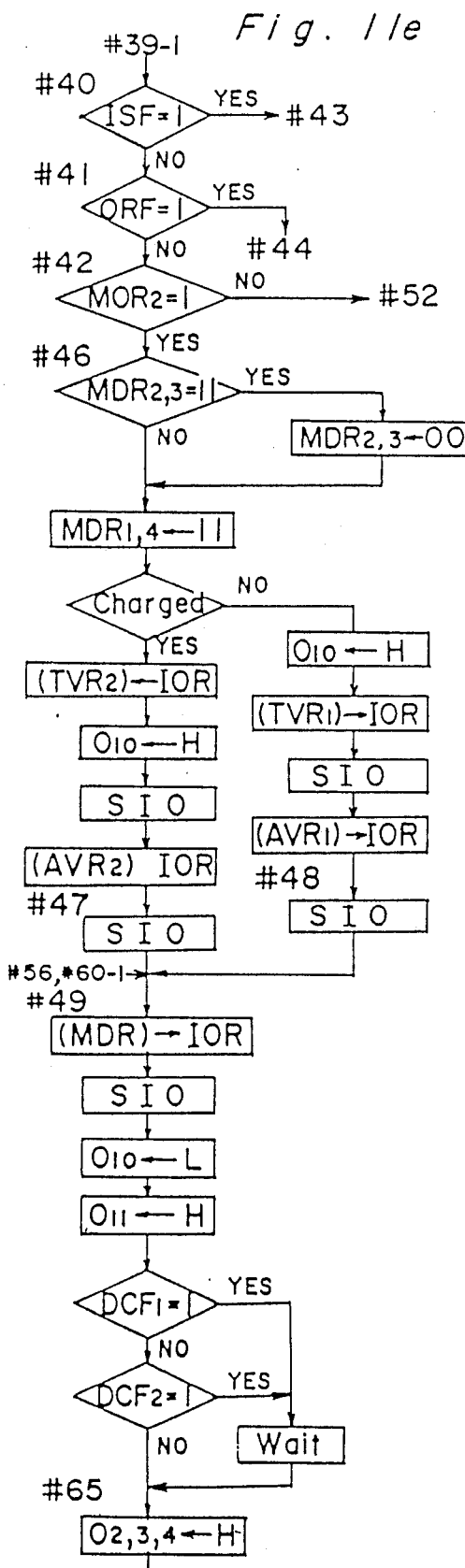
Figure 11E:
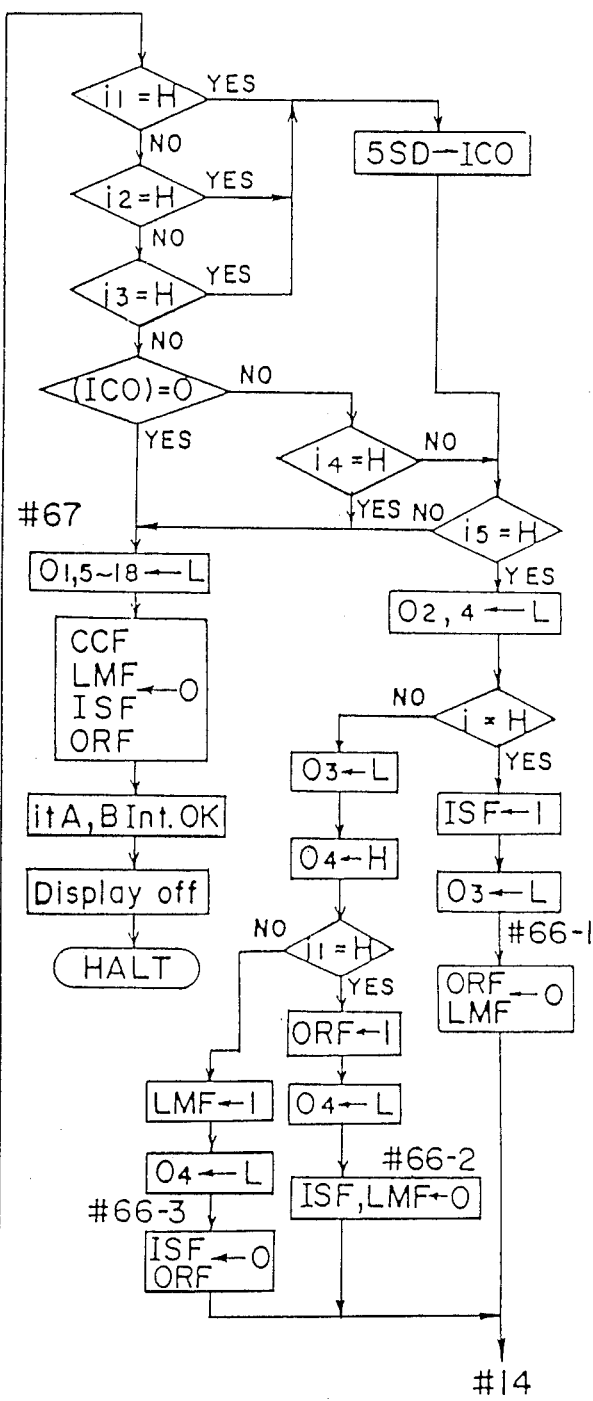

The operation of the circuit shown in FIG. 4 will now be described in connection with the flow charts of FIGS. 11a to 11-h. When one of light measuring switch S1, ISO switch ISS, and override switch ORS is closed, provided that the power source battery BAB is loaded with the main switch BMS being closed the interruption signal is applied to terminal itA through the AND circuit AN3 to initiate the operation starting from step #1. At first, a decision is made in order to determine if the content of a flag CCF is "1". This flag CCF will carry "1" when the data for the exposure control is calculated, or will carry "0" when it is not calculated. The operation which will take place when the interruption signal is inputed to terminal itA while the exposure control value has been calculated will be described later.

When the flag CCF is "0", terminal O1 produces "High". Thereupon, a transistor BTO is brought in a conductive state, thereby supplying electric power from the line VB. In addition, the AND circuit AN1 is disabled, and the AND circuit AN2 is enabled. Accordingly, a signal from the release switch S2 can be applied to terminal itA as an interruption signal. Then, terminals O3 and O4 produce "Low", and terminal O2 produces "High", thereby detecting whether terminal i1 is producing "High" or not. If terminal i1 is producing "High", interruption takes place as a result of the closure of the light measuring switch S1 and a flag LMF is therefore set to "1" and, at the same time, terminal O2 produces "Low". If the switch S1 is held open, and if it is detected at step #13 that terminal i1 is "Low", only terminal O3 produces "High". Then, it is detected whether or not terminal i1 is "High". If it is detected as "High", meaning that the interruption has taken place as a result of the closure of the ISO switch ISS, a flag ISF is set with "1". However, if terminal i1 is "Low", meaning that the interruption has taken place as a result of the closure of the override switch ORS, a flag ORF is set with "1".

Thereafter, terminal O3 produces "Low" with the program proceeding to step #14.

At step #14, terminal O5 produces "High". Then, by repeating the serial input and output operation for a predetermined number of times, the data from the lens assembly LE are read in and the data so read in are sequentially stored in the register LDR. After this operation, terminal O5 produces "Low" and terminal O31 and P32 produce "High". Thereafter, the serial input and output reading is performed to transfer the mode signal, applied from the code plate EM, and the signal from the counter switch SFC to register MOR. Thereafter, the terminals O31 and O32 produce "Low". It is to be noted that the data representing the mode is set in the bits MOR0 and MOR1 while the signal from the counter switch SFC is set in the bit MOR2. In this way, both the condition of the film counter and a signal indicative of the exposure control mode are stored in the register MOR.

Next, when terminal O9 produces "High", a pulse having a pulse width of 50 microsecond is outputed from terminal O8. Then, when data "00H" has been set in the input/output register IOR, the serial input and output operation is performed. Upon this operation, the data from the flash device FL is loaded in the register IOR, which is in turn stored in the register FDR. Step #15 is performed after terminal O9 produces "Low".

At step #15, a signal obtained from the light measuring circuit LMC, indicating the result of measurement of a target object to be photographed, is subjected to the analog-to-digital conversion. Thereafter, in order to eliminate, on the basis of the data from the lens assembly LE, terms of the full aperture value Avo and the full aperture metering error Avc both included in the analog-to-digital converted data, the equation $$(Bv - Avo - Avc) + Avo + Avc = Bv$$

is calculated to give a data of the brightness of the target object. Thereupon, the following equation $$Bv + (SVR) = Ev$$

is calculated to given the exposure value Ev.

Then, a decision is made as to determine if the bits MDR2 and MDR3 of the register MDR are "01". If they are "01", it means of the override on the "+" side as hereinbefore described and, therefore, the contents of a register ORR1 in which the override data on the "+" side is set is subtracted from the exposure value Ev to give an Ev value. On the other hand, if the contents of MDR2 and MDR3 are not "01", a decision is subsequently made of the override on the "−" side and, therefore, the contents of a register ORR2 in which the override data on the "−" side is added to the exposure value Ev to give an Ev value.

Upon completion of the foregoing operation, the program flow proceeds to step #16 at which a calculating operation of the exposure control data takes place. At first, at step #16, a decision is made in order to determine if the P mode has been established. If the P mode has been established, a calculation for the photo-taking under the P mode with the use of an ambient light and a calculation for the photo-taking under the P mode with the use of a flash light are performed, and a flag DCF1 is set to "0", followed by step #18. The flag DCF1 is a flag which will carry "1", when the present aperture value or the present exposure time is changed, but will carry "0" when none of these is changed. Under the P mode, since any change of the aperture value or the exposure time will not be accepted, the flag DCF1 is always "0".

If the result of decision at step #16 indicates that it is not the P mode, the program flow proceeds to step #19 at which another decision is made to find if it is the A mode. If it shows that it is the A mode, a change in the present aperture value is accepted and for this purpose, the operation is performed to effect such change of the data. At first, terminal O2 produces "High" and a decision is then made to find if terminal i2 is "High". If terminal i2 is "High", the aperture setting switch FSS is to be closed. Then, a decision is made to find if terminal i3 is "High". If terminal i3 is "High", the up-shift switch UPS is to be closed. In this case, terminal O2 produces "Low", and the operation is performed to change the data in a direction towards a smaller aperture. That is, a decision is first made to find if the contents of a register AVR3 in which the preset aperture value data is set is on the side of a larger aperture than the full aperture value data Avo fed from the ROM of the lens assembly LE. If the result of decision is yes (which occurs when the lens assembly is interchanged), the contents of the register AVR3 is set to Avo with the program flow subsequently proceeding to step #20. On the other hand, if the result of the decision is no, that is, if the contents of the register AVR3 is not on the side of a larger aperture than Avo, another decision is made to find if it is equal to Avo. A data dAv from the lens assembly LE, if the contents of register AVR3 is equal to Avo, or ½ if it is not equal thereto, is added to the contents of the register AVR3 and a decision is then made to find if the contents of the register is of a value greater than the maximum aperture value data Avm from the lens assembly. If it is of a greater value, the maximum aperture value Avm is set in the register AVR3 and the program flow proceeds to step #20, but if it is not of a greater value, step #20 immediately takes place. The maximum aperture value data Avm is also fed from the lens ROM.

The data dAv will now be described. The full aperture value Avo takes a different value when the type of the interchangeable lens assembly is changed. Some interchangeable lens assemblies have the full aperture value Avo which can be divided by 0.5Ev, i.e., in a unit of 0.5 Ev (Avo=0.5, 0.1, 1.5 2.0 . . . ), and others not in a unit of 0.5 Ev (for example, F2.5(Av=2.64), F3.5(Av=3.61), F1.8(Av=1.7) and so on). In the camera body, however, the aperture value to be set is in the multiple of 0.5 Ev, except for the fully opened aperture value. Therefore, in the case where the fully opened aperture is not in the multiple of 0.5 Ev, the first stop-down change from the fully opened aperture value to the next aperture value results in a change dAv which is smaller than 0.5 Ev. Therefore, after the first stop-down change, the aperture value can be set to the multiple of 0.5 Ev, with the aperture change effected at the rate of 0.5 Ev. Accordingly, in the case of the F2.5 lens assembly, dAv=0.36; in the case of the F3.5 lens assembly, dAv=0.39; and in the case of the F1.8 lens assembly, dAv=0.3. This data dAv is also transferred to the camera body from the lens ROM.

If it is determined that terminal i3 is not "High" and, at the same time, the up-shift switch UPS is not closed at the timing when terminal O2 is "High", terminal O2 produces "Low", and terminal O3 produces "High", thereby making a detection, based on the state of terminal i3, whether or not the down-shift switch is closed. If the down-shift switch DOS is closed, terminal O3 produces "Low" and ½ is subtracted from the content of the register AVR3. Then, a decision is made to find if the result of the subtraction is on the side of the fully opened aperture with respect to the fully opened aperture value Avo, if it is of a value on the side of the fully opened aperture, the fully opened aperture value Avo is set in the register AVR3 with the program flow subsequently proceeding to step #20.

At step #20, the flag DCF1 is set to "1" to show that the setting data has been changed, followed by step #21. On the other hand, in the case where the aperture switch FSS is not closed, or where both the up-shift and down-shift switches UPS and DOS are not closed, the data will not be changed and the flag DCF1 is set to "0" at step #23, followed by step #21. At step #21, the calculation for the photo-taking under the A mode with the use of the ambient light is performed and, at the subsequent step #22, the calculation for the photo-taking under the A mode with the use of the flash light is performed. Thereafter, the program flow proceeds to step #24.

If it is determined that the mode is other than the A mode at step #19, a decision is made at step #25 to determine if it is the S mode. If it is determined as the S mode, a decision is made at steps #25 and #26 to determine from the state of terminal i2 if the exposure time switch SSS is closed. If the result shows that the exposure time switch SSS is not closed, the flag DCF1 is set to "0" at step #28 followed by step #29. On the other hand, if the result of decision at step #27 shows that the exposure time switch SSS is closed, a decision is then made to find if the up-shift switch UPS is closed. If the result of decision at step #30 shows that the up-shift switch UPS is closed, "1" is added to the content of the register TVR3 in which the present exposure time data is set. Whether or not the result of the addition is greater than the data Tvm is determined at step #31. If the result of the addition is greater than the data Tvm, Tvm is set in the register TVR3, but if it is not greater than that, the content remains unchanged and the flag DCF1 is set to "1" at step #32, followed by step #29.

If the result of the decision at step #30 shows that the up-shift switch UPS is not closed, whether or not the down-shift switch DOS is closed is determined at step #33. If the down-shift switch DOS is closed, "1" is substracted from the register TVR3 at step #34, and subsequently, a decision is made to determine if the result of the subtraction has a longer exposure time than the maximum exposure time Tvo. If it has the longer exposure time, Tvo is set in the register TVR3, but if not, the content remains unchanged and the flag DCF1 is set to "1". The program flow then proceeding to step #29.

When the exposure time switch SSS is not closed, or when both of the up-shift and the down-shift switches UPS and DOS are closed while the exposure time switch SSS is closed, the flag DCF1 is set to "0" and the program flow proceeds to step #29. At step #29, the calculation for the photo-taking under the S mode with the use of the ambient light is performed, followed by the calculation for the photo-taking under the S mode with the use of the flash light. Then, the program flow subsequently proceeds to step #18.

If it is determined at step #25 that the mode is not the S mode, the mode is the M mode. In that case, both the aperture value data and the exposure time value data can be changed. When both of the aperture value data and the exposure time data have been changed in a manner similar to that described hereinbefore, the calculation for the photo-taking under the M mode with the use of the ambient light and that with the use of the flash light are successively performed. Thereafter, the program flow proceeds to step #18.

At step #18, since the exposure control data has been calculated, the exposure control operation can be carried out and thus, flag CCF is set to "1". Then, the interruption signal can be inputed to terminal itA or itB at any time. Subsequently, a decision is made based on the data from the flash device FL in order to find if the flash device being powered is loaded. If no loading signal is present, indicating that the flash device is not loaded, the bits MDR5 and MDR6 of the register MDR are rendered to be "00", and the program flow proceeds to step #35. If, however, the loading signal is present, a decision is then made to find if a signal indicative of the completion of the light adjustment, which signal is hereinafter referred to as FDC signal, is being inputed. If the FDC signal is inputed, the bits MDR5 and MDR6 of the register MDR are set to "11" with the program flow then proceeding to step #35. On the other hand, if the FCD signal is not inputed, a decision is then made to determine if a charge completion signal is being inputed. If the charge completion signal is inputed, bits MDR5 and MDR6 are set to "10", but if not, they are set to "01".

At step #35, terminal O9 produces "High" and, thereafter, the transfer of data from the camera to the flash device FL takes place. At the subsequent step #36, a pulse having a pulse width of 100 microsecond is produced from terminal O8. Then, the ISO data set in the register SVR is set in the input/output register IOR, the content of which is outputed through a digital-to-analog converter from an analog signal output terminal AN0. Thereupon, by performing the serial input and output operation, the ISO data is transferred to the flash device. Following that, the content of the register AVR2 in which the aperture value data for the flash photography is loaded is loaded in the register IOR and is then transferred to the flash device and, at the same time, the content of the register TVR2 in which the exposure time data for the flash photography is set is set in the register IOR and is then transferred to the flash device. Thereafter, of the data from the lens assembly LE, the content of a register LDRf in which a focal length data is set is loaded in the register IOR and is then transferred to the flash device FL, thereby producing "Low" from terminal O9. In this way, the data from the camera body are transmitted to the flash device. Based on these data so transferred, the flash device performs various functions including the display of the available range and the automatic setting of the lighting coverage angle.

At step #40, a decision is made as to whether the flag ISF is "1". When it is "1" meaning that the ISO switch is closed, the program goes to step #43. On the other hand, when it is "0", a decision is made at step #41 in order to determine if the flag ORF is "1". If it is "1", indicating the closure of the override switch ORS, the program flow proceeds to step #44. On the other hand, if it is "0", the content of a bit MOR2 of register MOR is discriminated. If the content of the bit MOR2 is "0", it indicates that the film count switch SFC is closed, but the film counter has not yet reached the position 1 (the first frame number that can be photographed) and, therefore, the program flow proceeds to step #52. If at step #42, it is determined that bit MOR2 of register MOR is "1" meaning that the film counter switch SFC is opened, the program flow proceeds to step #46. At this time, since it is under the mode in which the exposure control value is to be displayed, bits MDR2 and MDR3 are rendered to be "00" if they are "11", and at the same time, bits MDR1 and MDR4 are rendered to be "1". Accordingly, the symbol "+/−" will not be displayed unless the override takes place, and symbols F and SS are displayed on the display device LDP.

Next, a decision is made to find whether the charge completion signal is being inputed. If the charge completion signal is inputed from the flash device FL to the microcomputer MCB, both the exposure time (content of the register TVR2) and the aperture value (content of the register AVR2) for the flash photography are serially transferred to the display section DPC, but if it is not inputed, both the exposure time (content of the register TVR1) and the aperture value (content of the register AVR1) for the photography under the ambient light are serially transferred to the display section DPC. Thereafter, the program flow proceeds to step #49 shown in FIg. 11e.

If it is determined at step #40 that the ISD switch ISS is closed, step #43 takes place at which "High" is produced from terminal O2. At step #50, a decision is made in order to determine whether the up-shift switch UPS is closed or not. When the up-shift switch UPS is closed, a decision is further made at the subsequent step #58 in order to determine if a fraction of the ISD data is $\frac{1}{4}$. If it is $\frac{1}{4}$, $\frac{1}{2}$ is added to $\frac{1}{4}$ and the result is placed in the register SVR. But, if it is not $\frac{1}{4}$, $\frac{1}{4}$ is added to that data and the result is placed in the register SVR. Accordingly, the fraction portion becomes $\frac{1}{4}$ if it is 0, $\frac{3}{4}$ if it is $\frac{1}{2}$, or 0 if it is $\frac{3}{4}$. That is, as hereinbefore described, such compromises as $\frac{1}{4}=\frac{1}{4}$, $\frac{3}{4}=\frac{3}{4}$ and 0=0 are employed. Then, a decision is made in order to find whether or not the content of the register SVR2 is greater than the maximum ISO data Svm. If the content of the register SVR2 is greater than Svm, Svm is set in the register SVR2, but if it is not, Svm remain unchanged. Thereafter, the program flow proceeds to step #52.

When, at step #50, it is determined that the upshift switch UPS is not closed, step #50 is proceeds to steps #53 and #54 at which only terminal O3 produces "High". At the subsequent step #55, a decision is made in order to find whether or not the down-shift switch DOS is closed. When the down-shift switch DOS is closed, and if a fraction portion of the manually present data is $\frac{3}{4}$, $\frac{1}{2}$ is subtracted, but when it is not $\frac{3}{4}$, $\frac{1}{4}$ is subtracted. In other words, it is assumed as $\frac{1}{4}$ if the fraction portion is $\frac{3}{4}$, 0 if it is $\frac{1}{2}$, or $\frac{3}{4}$ if it is 0. Then, a decision is made in order to determine if the content of the register SVR is smaller than the minimum ISO data Svo. If the content of the register SVR is smaller than the data Svo, the data Svo is set in the register SVR2, but if it is not, the content of the register SVR remains unchanged. Thereafter, the program flow proceeds to step #52.

In addition, if the result of the decision at step #55 shows that the down-shift switch DOS is not closed, the content of the register SVR remain unchanged and the program flow proceeds to step #52.

At step #52, flag DCF2 is set to "1", and at the same time, bit MDR0 is set to "1" and bits MDR1, MDR4 and MDR7 are set to be "0". Then, the contents of the register SVR are loaded in the register IOR, and "High" is produced from terminal O30, thereby carrying out the serial input and output operation. Thereupon, a newly presented ISO data is fixedly stored in the storage-register LAC (FIG. 5) within the circuit CIM. Subsequently, data necessary to turn off the display section and the ISO data are fed to the display circuit DPC and the program flow then proceeds to step #49.

If at step #41 it is determined that the flag ORF is "1" and the override switch ORS is closed, step #44 takes place. That is, at step #57, a decision is made in order to find whether or not the up-shift switch UPS is closed. If the up-shift switch UPS is closed, bits MDR2 and MDR3 produce "01", and $\frac{1}{2}$ is added to the content of the register ORR1. Then, another decision is made in order to determine whether or not the content of the register ORR1 is above the maximum value ODm. If it is above the maximum value ODm, ODm is set in the register ORR1, but if it is not, the content of the register ORR1 is unchanged and the program flow proceeds to step #58 at which the flag DCF is set to "1". Then, the program proceeds to step #60.

If at step #57 it is determined that the up-shift switch UPS is not closed, step #61 takes place to produce "High" from only terminal O3. Then, the program proceeds to step #62 at which a decision is made in order to determine if the down-shift switch DOS is closed. If the down-shift switch DOS is closed, $\frac{1}{2}$ is added to the content of the register ORR2 and, if the result exceeds the maximum value ODm, the maximum value ODm is set in the register ORR2, but if it does not exceeds, the content remains unchanged and the flag DCF2 is set to "1". Then, the program proceeds to step #60.

Figure 11F:
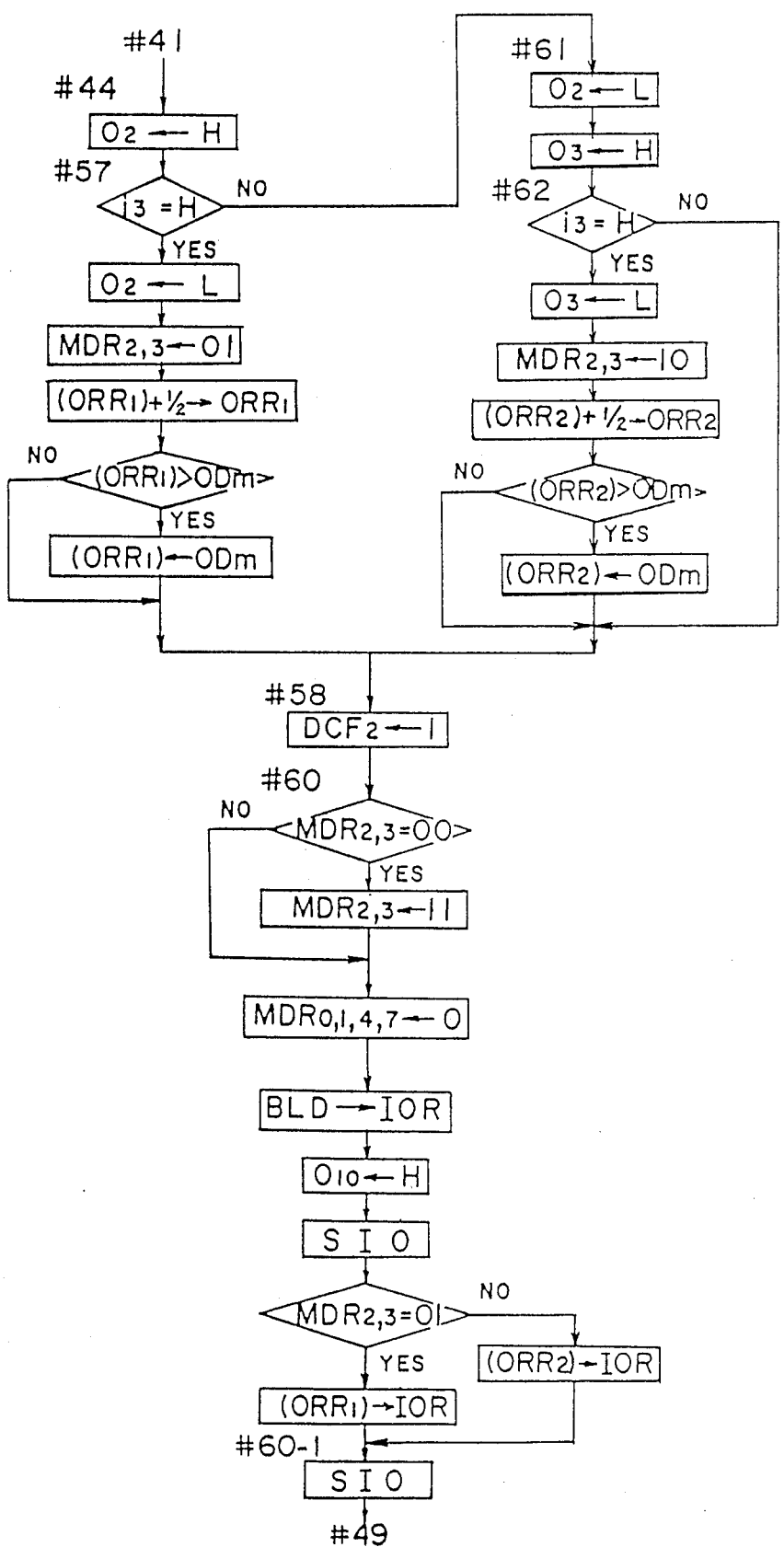
Figure 11G:
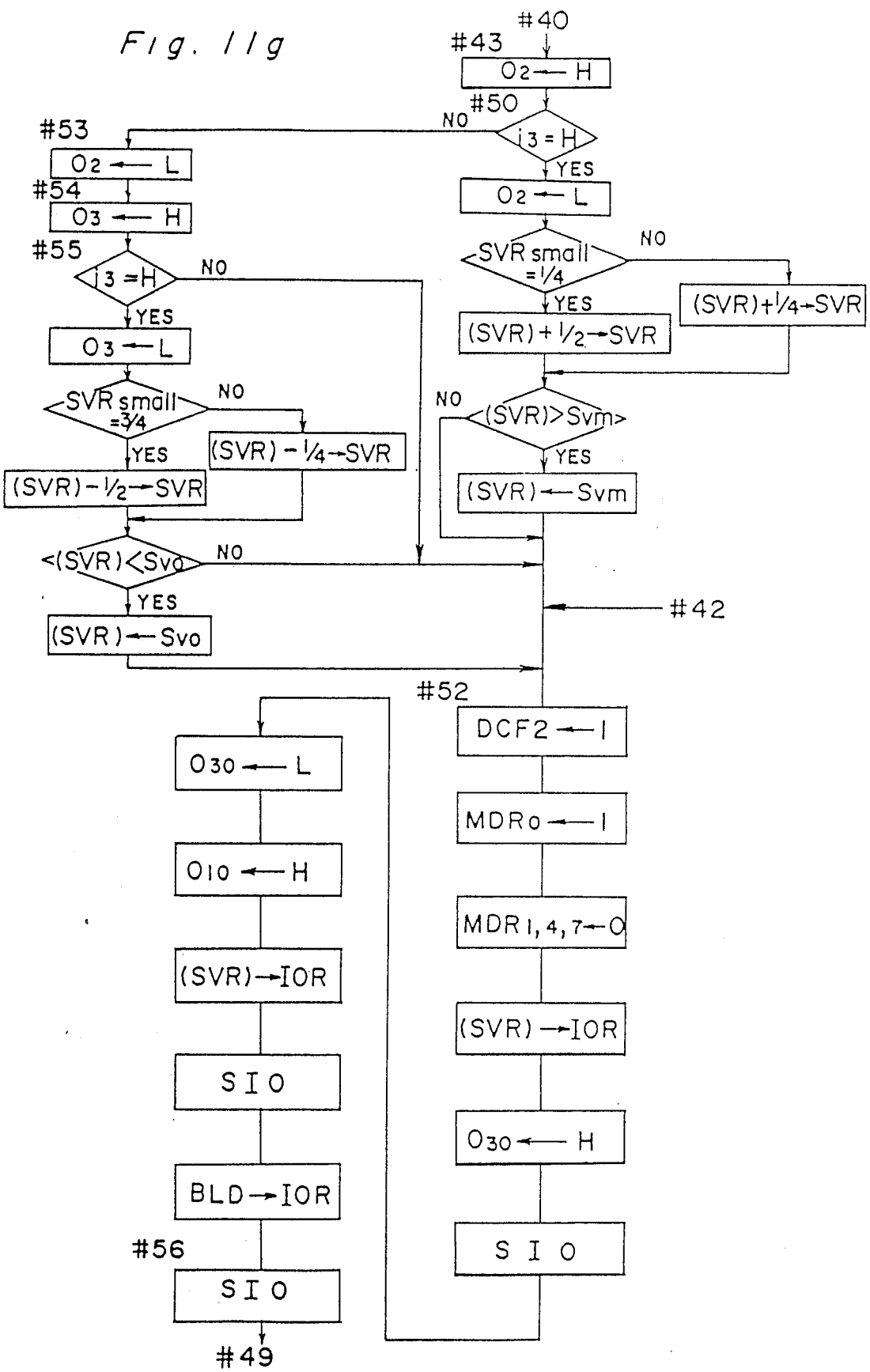
Figure 11H:
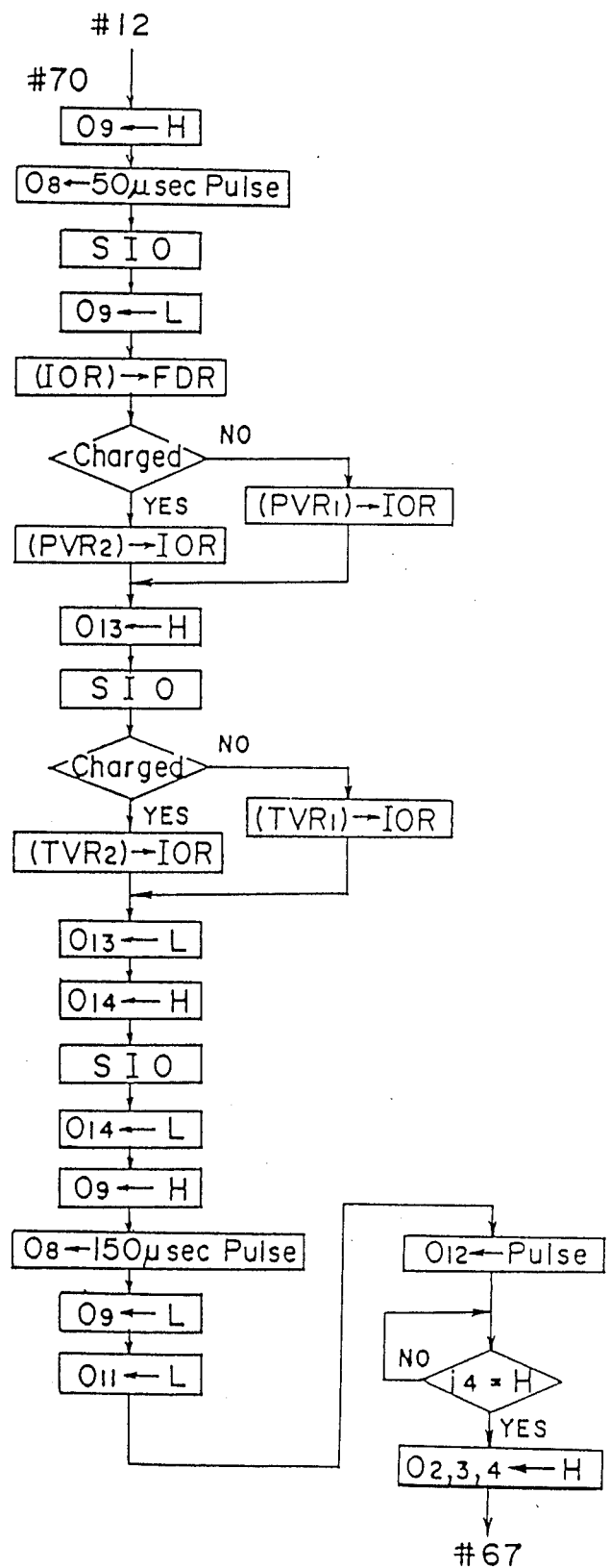

If at step #62 the down-shift switch DOS is not closed, the flag DCF2 is set to "1" without altering MDR2, MDR3 and the registers ORR1 and ORR2, and thereafter, the program goes to step #60 shown in FIG. 11f. At step #60, a decision is made in order to determine if the bits MDR2 and MDR3 of the register MDR are "00". If they are "00", they are changed to "11" for the display. Then, MDR0, MDR1, MDR4, MDR7 are made to be "0". Accordingly, in such case, only the symbol "+/−" for the override is displayed.

Then, the blank data BLD is outputed to the register IOR and then transferred to the display section DPC to turn off the display of digits indicative of the ISO or SS value. Thereafter, if the contents of MDR2 and MDR3 are "01" indicating that the override is effected on the "+" side, the content of the register ORR1 is transferred to the display section DPC, but if they are not "01", the content of the register ORR2 is transferred to the display section DPC. Then, the program goes to step #49. At step #49, the content of the register MDR is transferred to the display section DPC. Then, the terminal O11 produces "High", thereby enabling the display by the light emitting diode FLD in the display section.

Subsequently, a decision is made to determine if either one of the flags DCF1 and DCF2 is "1". If either one is "1", it indicates that the data has been changed. In that case, in order to prevent the data from being changed at a high speed, a predetermined time is waited, and then the program proceeds to step #65. On the other hand, if both of the flags DCF1 and DCF2 are "0", step #65 is carried out immediately. At step #65, the terminals O2, O3 and O4 produce "High". Then, it is detected whether or not the terminals i1, i2 or i3 is receiving "High", that is, whether or not at least one of the key switches is closed, is determined. If any one of the key switch is closed, a data representing five seconds is set in an internal counter ICO. Then a decision is made as to determine if the main switch BMS is closed. If the main switch BMS is closed, the terminals O2 and O4 produce "Low" and a decision is then made to determine if the switch ISS has been closed. If the switch ISS is closed, the flag ISF is set to "1", and at the same time, the flags ORF and LMF are set to "0". Then, the program returns to step #41. However, if the switch ISS has not yet been closed, a decision is further made as to determine if the switch ORS is closed. When it is determined that the switch ORS is closed, the flag ORF is set to "1", and at the same time, the flags LMF and ISF are set to "0". Then, the program returns to step #14. Where both of the switch ISS and ORS are opened, the flag LMF is set to "1" and the program flow then returns to step #14. Accordingly, during a period of five seconds in which none of the switches is closed, the exposure time and the aperture values are displayed.

If none of the key switches is closed, a decision is made as to determine if the content of the internal counter ICO is "0". If it is "0", the program flow proceeds to step #67, but if it is not "0", a decision is then further made as to find if the reset switch S4 is closed. If the reset switch S4 is not closed, the state of the main switch BMS is discriminated. The program then returns from step #66 to step #14.

After the lapse of five seconds subsequent to the opening of all of the key switches, or at the moment when the reset switch S4 is closed or when the main switch BMS is opened, the program goes to step #67, thereby producing "LOW" from the terminals O1 and O5 to O18, and also then, the flags CCF, LMF, ISF and ORF are set to "0", and in turn the interruption by means of the terminal itA or itB is enabled. And the flow advances to turn off the display in a manner similar to the operation at step #3 et seqq. Then, the "HALT" condition is established.

When the release switch S2 is closed while the calculation of the exposure control value has been completed to set "1" in the flag CCF, interruption to terminal itA is accepted, and thereafter, the program proceeds to step #70. At step #70, terminal O9 produces "High" and the pulse of 50 microsecond in duration is outputed from terminal O8 to permit the data to be read from the flash device. A decision is then made to determine if the charge completion signal is inputed. If it is inputed, the content of a register PVR2 in which the value of the number of f-stop positions to be stopped down for the flash photography is set, is transferred to the aperture control circuit APC. But if it is not inputed, the content of a register PVR1 in which the value of the number of f-stop positions to be stopped down for the photography under the ambient light is set, is transferred to the aperture control circuit APC. Thereafter, a decision is made to determine again if the charge completion signal is inputed. If it is inputed, the content of the register TVR2 in which the exposure time for the flash photography is set, is transferred to the exposure time control circuit TIC. But if it is not inputed, the content of the register TVR1 in which the exposure time for the photography under the ambient light is set, is transferred to the exposure time control circuit TIC.

Then, when the terminal O9 produces "High", a pulse of 50 microsecond in duration is transmitted from the terminal O8 to the flash device FL. Accordingly, the flash device can detect that the exposure control operation has been initiated. Thereupon, terminal O11 produces "Low" to turn off the light emitting diode FLD so that no lighting display will take place during the exposure control being taken place. Subsequently, a pulse is outputed from terminal O12 to cause the release circuit RLC to effect a shutter release operation thereby to initiate the exposure control operation. Then, it is waited until the reset switch S4 closes in response to the completion of opening of the shutter curtain, which is effected after the completion of the exposure control operation. When the reset switch S4 is so closed, the terminals O2 to O4 produce "High". Then, the program returns to step #67, thereby to repeat the previously described operation before the "HALT" condition is established.

Figure 12:
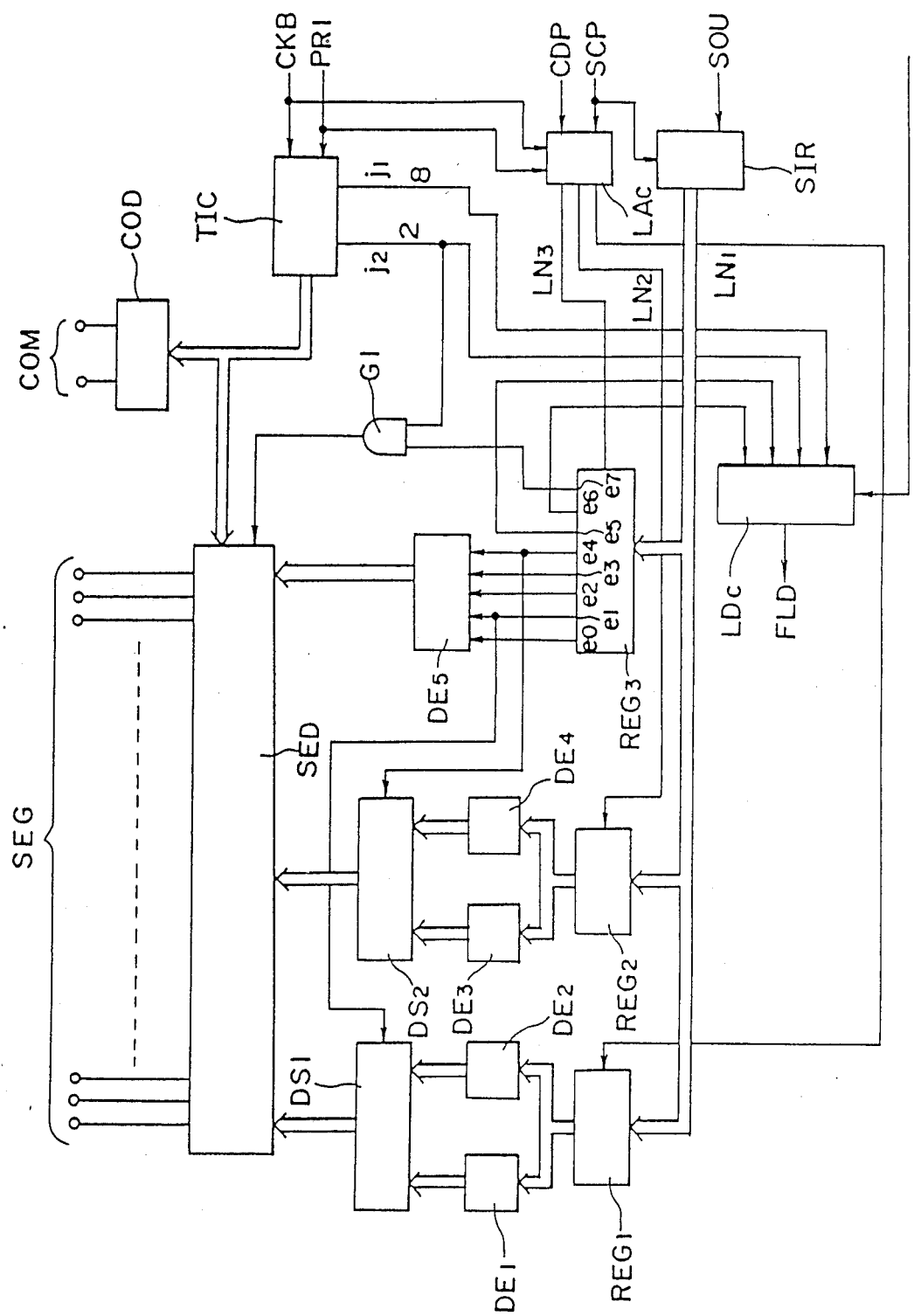
FIG. 12 is a circuit diagram showing the details of a display control DPC of FIG. 4b.

FIG. 12 illustrates the details of the display circuit shown in FIG. 4. In this circuit, when a terminal CDP becomes "High", a latch pulse is outputed from a latch control circuit LAC to terminals LN1, LN2 and LN3 each time eight synchronizing clock pulses SCP are inputed. The data read in the serial input register SIR are sequentially taken in registers REG1, REG2 and REG3. Accordingly, the exposure time or the ISO value data is stored in the register REG1, the aperture value or the override value data is stored in the register REG2, and the display mode data (that is, the content of the internal register MDR of the microcomputer MCB) is stored in the register REG3. Here, the outputs of terminals e0 to e7 corresponding to the bits MDR0 to MDR7 of the register MDR.

A decoder DE1 serves to convert the output of the register REF1 into a value for the display of the exposure time, and a decoder DE2 serves to convert into a value of the display of the ISO data. A data selector DS1 serves to send data from the decoder DE1 if terminal e1 is "High", that is, during the exposure time display mode, and to send data from the decoder DE2 if terminal e1 is "Low", that is, during the ISO display mode. In addition thereto, a decoder DE3 serves to convert the output of the register REG3 into a value for the display of the aperture value, and a decoder DE4 serves to convert into a value for the display of the override. Another data selector DS2 serves to send data from the decoder DE3 if terminal e4 is "High", that is, during the aperture value display mode, but it serves to send data from the decoder DE4 if terminal e4 is "Low", that is, when the mode is not the aperture value display mode. A further decoder DE5 is a decoder operable to convert into data for the display of the symbol, based on data from the terminals e0 to e4 of the register REG3.

A timing signal output circuit TIC serves to output clock pulses of 8Hz from a terminal j1 and clock pulses of 2Hz from a terminal j2 and also to supply a timing signal both to a common signal output circuit COD and a segment signal output circuit SED. The segment signal output circuit SED serves to output a signal for the display, based on the data fed from the data selectors DS1 and DS2 and the decoder DE5, to activate a liquid crystal display. If terminal e7 of the register REG3 is "High", 2Hz clock pulses emerge from an AND circuit G1 to cause the liquid crystal display to blink at 2Hz.

Both signals from the terminals e5 and e6 of the register REG3 and the 8Hz and 2Hz clock pulses from the respective terminals j1 and j2 are supplied to a drive circuit LDC. If a terminal DPE is "High", circuit LDC produces a drive signal to terminal FLD depending on the state of the flash device.

Figure 7:
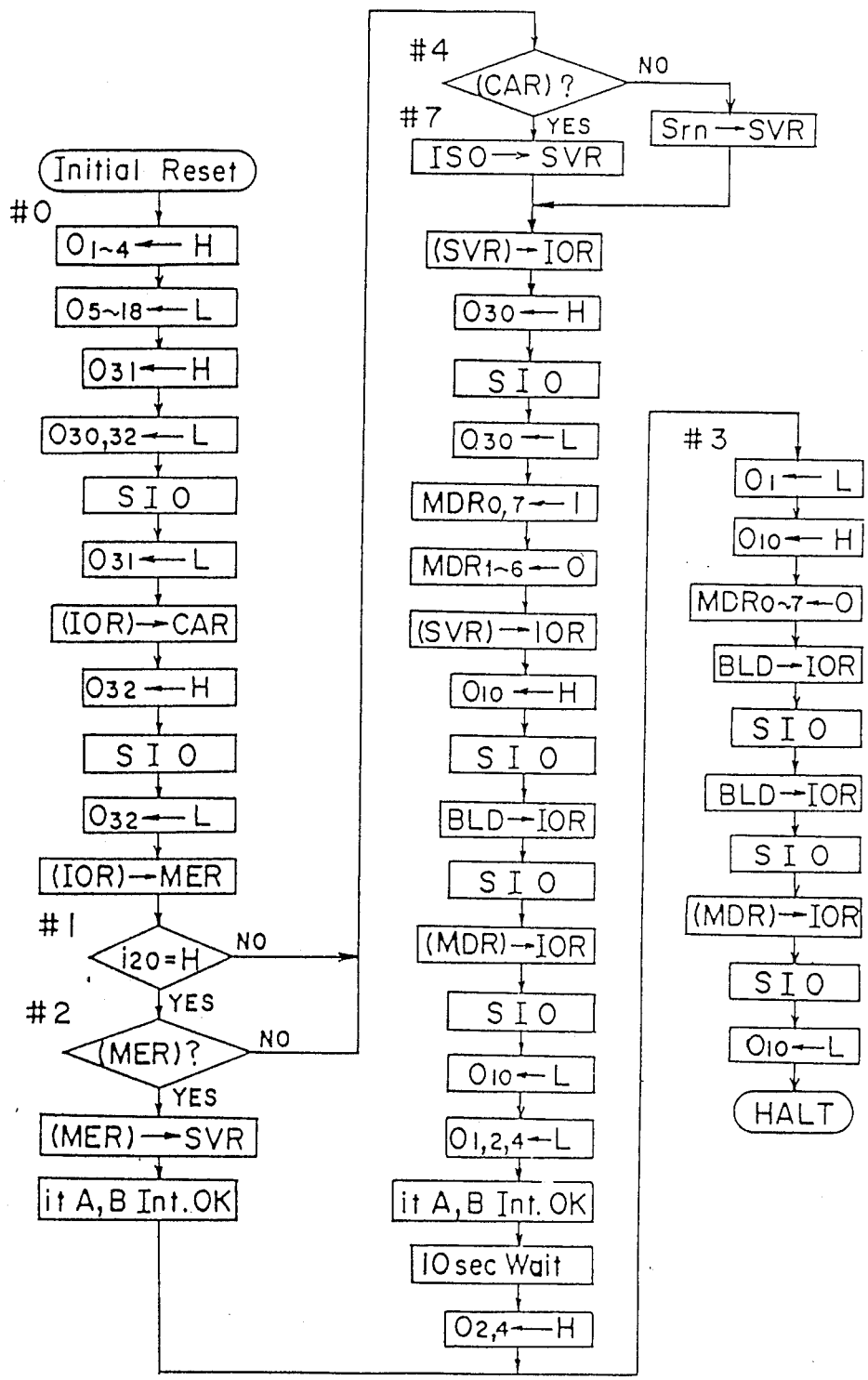
FIG. 7 is a flow chart of a microcomputer provided in the camera body, particularly showing the operations for the initial setting.
Figure 13:
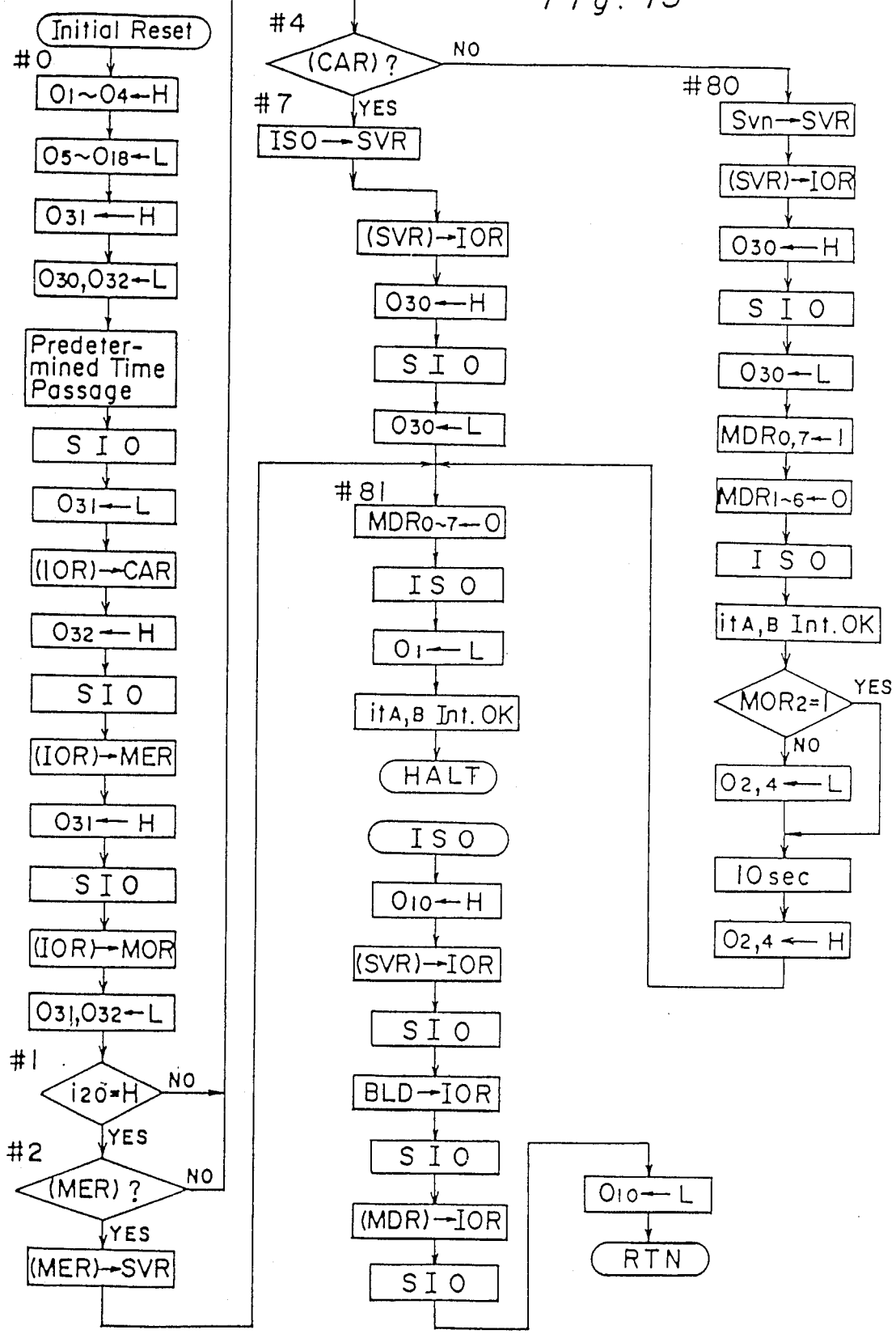
FIG. 13 is a flow chart similar to FIG. 7, but showing a modification thereof.

FIG. 13 illustrates a flow chart which is a modification of the flow chart shown in FIG. 7. The program flow to step #4 shown in FIG. 13 is the same as in FIG. 7 except that a predetermined time is allowed to pass before the data are completely read out from the film cartridge, and that both the exposure control data and the signal from the film counter switch are set in the read-out register MOR. The reason for the passage of the predetermined time allowed before the data are completely read out from the film cartridge is because, when the battery is loaded, vibration takes place to such an extent as to result in that the contact of the feelers with the film cartridge may not be stabilized and, therefore, there is the possibility that, if the data are read out from the film cartridge immediately after the loading of the battery, they would be read out erroneously. The predetermined time allowed to pass subsequent to the loading of the battery is so selected for the contact of the feelers with the film cartridge to be stabilized before the data are actually read out from the film cartridge. When it is determined at step #4 that the data has been read in from the film cartridge, the data so read out is set in the register SVR at step #7 and a program flow similar to that occurring when the back-up battery BUB is normal and the output of the register LAC is also normal is subsequently performed. This will not constitute an exposure error even if the ISO data are read in from the film cartridge at the time of the replacement of the battery, and neither the blinker display warning of the ISO data nor the release lock takes place.

On the other hand, if it is determined at step #4 that no data is read in from the film cartridge, the fixed ISO data (ISO 100 Svn) is set in the register SVR at step #80 and this data is displayed by blinking for ten seconds. If at this time two bits of the register MOR indicates that the counter switch CFS has not been closed, this ten seconds is utilized as a period in which no drive is effected by any switch other than the ISO switch ISS. Where the counter switch CFS is opened, since the possibility is small that the film is loaded, only the blinking of ISO is effected and no drive is effected even by S1 and ORS. Unless the ISO switch ISS is closed, the microcomputer MCB, after the passage of ten seconds, proceeds to step #81 at which the ISO display is effected and the condition is established wherein a drive can be effected by any switch, the microcomputer MCB being subsequently brought to a halt.

Figure 4A:
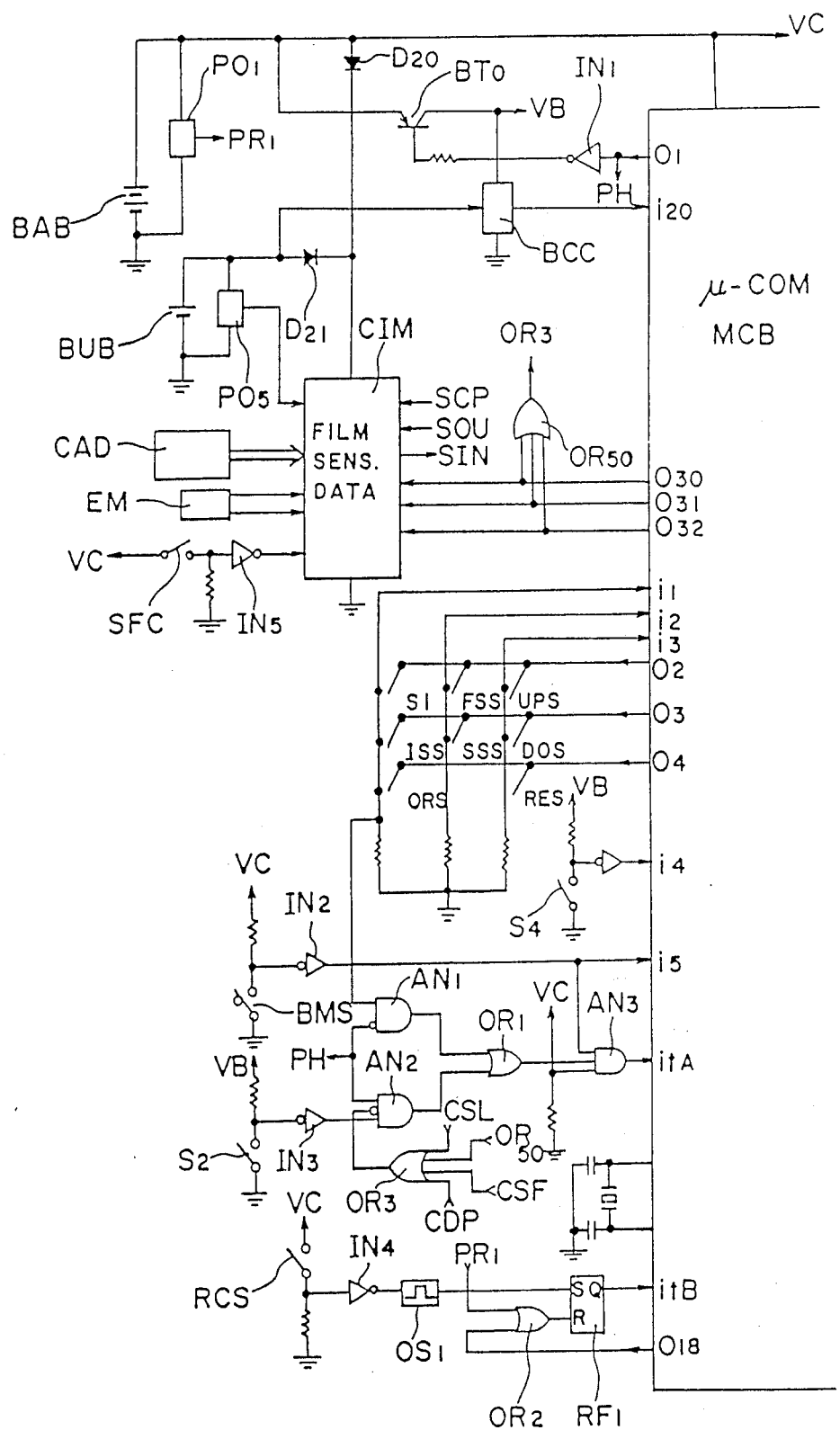

It is to be noted that, in the foregoing embodiment, switch SFC in FIG. 4a may be alternatively switched by detecting whether or not the film is actually loaded in the camera, e.g., by detecting the loading of the film cartridge or detecting directly the existence of the film (for example, at a film spool). In such a case the release lock can be disabled by detecting by means of switch SFC that the film has not yet been loaded.

FIG. 14 illustrates an example of the display according to the preferred embodiment of the present invention, wherein FIG. 14a illustrates an example of the display effected after the setting of the exposure time and FIG. 14b illustrate an example of the display effected at the time of the setting of the film sensitivity. As shown in FIG. 14a, the first display area which is used to display the shutter speed and the film sensitivity one at a time is shown as displaying the shutter speed reading 1/2000 second, while a second display area is shown as displaying another data relating to exposure, e.g., the aperture value reading F5.6. On the other hand, in FIG. 14b, the first display area is shown as displaying the film sensitivity reading ISO 400 while the second display area displays nothing. Thus, information to be displayed at the time of the setting of the shutter speed is enriched with another data displayed as well as the shutter speed. On the other hand, at the time of the setting of the film sensitivity which solely depends on an actually loaded particular film without any comparison with another data and which has no necessity to be changed depending on each shot as long as the once loaded film is continued to be used, nothing is displayed other than the film sensitivity to clarify such a nature of the film speed setting.

Although in the foregoing embodiment the data on the film cartridge are read out at a particular time after a lapse of a predetermined time period from the closure of the back lid, the concept of the present invention can be equally applicable to a type of camera wherein, with no storage for storing the read ISO information used therein, the ISO data is continuously read in at all times. In such a case, the reading of the data from the film cartridge is inhibited until the predetermined time period passes subsequent to the closure of the back lid.

In addition, although the switching of the exposure control modes has been described as effected by means of the slide switch, it is to be noted that the same can be effected by a combination of a key for instructing the change in the exposure control mode and one of the up-shift and down-shift keys. In such a case, it should be designed that, even by a depression of the exposure control mode change instructing key, interruption can be effected to the interrupting terminal itA of the microcomputer to permit the light measurement and display to be performed.

Moreover, although in the foregoing embodiment the back-up battery and the storage circuit have been described as used for keeping the ISO data stored even when the main battery is removed for replacement purpose, they may not be always necessary. In the case of a camera without such a back-up means, the decision to make both the warning and the release lock should be effected, depending on whether or not the data is successfully read from the film cartridge upon the loading of the new main battery.

Although the present invention has been fully described with reference to several preferred embodiments, many modifications and variations thereof will now be apparent to those skilled in the art, and the scope of the present invention is therefore to be limited not by the details of the preferred embodiments de-

TABLE 1

| ISO | Sv | K2 | K3 | K4 | K5 | K6 |
|---|---|---|---|---|---|---|
| 25 | 3 | X | X | X | O | X |
| 32 | 3⅓ | X | X | X | X | O |
| 40 | 3⅔ | X | X | X | O | O |
| 50 | 4 | O | X | X | O | X |
| 64 | 4⅓ | O | X | X | X | O |
| 80 | 4⅔ | O | X | X | O | O |
| 100 | 5 | X | O | X | O | X |
| 125 | 5⅓ | X | O | X | X | O |
| 160 | 5⅔ | X | O | X | O | O |
| 200 | 6 | O | O | X | O | X |
| 250 | 6⅓ | O | O | X | X | O |
| 320 | 6⅔ | O | O | X | O | O |
| 400 | 7 | X | X | O | O | X |
| 500 | 7⅓ | X | X | O | X | O |
| 640 | 7⅔ | X | X | O | O | O |
| 800 | 8 | O | X | O | O | X |
| 1000 | 8⅓ | O | X | O | X | O |
| 1250 | 8⅔ | O | X | O | O | O |
| 1600 | 9 | X | O | O | O | X |
| 2000 | 9⅓ | X | O | O | X | O |
| 2500 | 9⅔ | X | O | O | O | O |
| 3200 | 10 | O | O | O | O | X |
| 4000 | 10⅓ | O | O | O | X | O |
| 5000 | 10⅔ | O | O | O | O | O |
| . | . | . | . | . | . | . |
| . | . | . | . | . | . | . |
| | | 1 | 2 | 4 | ⅓ | ⅔ |

O: Conductive  X: Non-conductive

TABLE 2

| Register | Contents | Symbol |
|---|---|---|
| TVR1 | Exposure time for photo-taking | Tva |
| TVR2 | Exposure time for flash photography | Tvf |
| TVR3 | Preset Exposure time | Tvs |
| AVR1 | Aperture value for photo-taking | Ava |
| AVR2 | Aperture value for flash photography | Avf |
| AVR3 | Preset Aperture value | Avs |

TABLE 3

| Bit | CAR7 | CAR6 | CAR5 | CAR4 | CAR3 | CAR2 | CAR1 | CAR0 |
|---|---|---|---|---|---|---|---|---|
| Position | | K12 | K11 | K6 | K5 | K4 | K3 | K2 |
| Weight | | | | ⅔ | ⅓ | 4 | 2 | 1 |

TABLE 4

| Bit | Signal | Conditions |
|---|---|---|
| MDR0 | 0 | No display of SS & ISO |
| | 1 | Display SS or ISO |
| MDR1 | 0 | Display ISO |
| | 1 | Display SS |
| MDR2 | 01 | Override on + side |
| MDR3 | 10 | Override on − side |
| | 11 | Override 0 |
| | 00 | No display of Override |
| MDR4 | 0 | No display of F-stop |
| | 1 | Display F-stop |
| MDR5 | 00 | Light off indicating unloading |
| MDR6 | 01 | 2Hz blinking indicating loading |
| | 10 | Light on indicating charge completion |
| | 11 | 8Hz blinking indicating FDC |
| MDR7 | 0 | Light on |
| | 1 | 2Hz blinking |

What is claimed is:

1. A camera system having a camera body and at least one camera necessary attachable to the camera body, comprising:

a plurality of circuit elements provided in the camera body and in said at least one camera accessory for performing predetermined respective operations;

means provided in the camera body for controlling the plurality of circuit elements, including:

a data bus for connecting the control means with the plurality of circuit elements, said data bus serially sending data from the control means to the plurality of circuit elements and from the plurality of circuit elements to the control means;

at least one signal line for connecting the control means with each of said circuit elements, respectively, for sending clock pulses utilized for synchronizing the data sent through the data bus; and a plurality of selecting lines for selecting, by the control means, which circuit element receives the data from the control means and sends the data to the control means; and said control means selecting, in accordance with predetermined camera operation, the circuit element which operates through said selecting lines, said control means receiving data from the selected circuit element through the data bus with pulses through the signal line to calculate data sent to the circuit element according to the predetermined camera operation, and said control means sending the calculated data to the selected circuit element through the data bus with pulses through the signal line for operating said circuit element.

2. The camera system as claimed in claim 1, wherein said at least one camera accessory comprises a plurality of camera accessories and wherein said camera body is adapted to be attached to said plurality of camera accessories, said means for controlling includes means for sending data received from a circuit element in a camera accessory to a circuit element in another camera accessory.

3. The camera system as claimed in claim 1, wherein said control means includes means for transmitting data received from a circuit element provided in the camera body to another circuit element provided in the camera accessory.

4. The camera system as claimed in claim 1, wherein said control means includes means for transmitting data received from a circuit element provided in the camera accessory to another circuit element provided in the camera body.

5. The camera system as claimed in claim 1, wherein said circuit element provided in the camera body includes a circuit for displaying information on the camera body.

6. The camera system as claimed in claim 1, wherein said circuit element provided in the camera accessory includes a circuit provided in an interchangeable lens mountable on the camera body.

7. The camera system as claimed in claim 1, wherein said circuit element provided in the camera accessory includes a circuit provided in a flash device attachable to the camera body for illuminating an object to be photographed.

8. A method of operating a camera system having a plurality of circuit elements provided in a camera body for performing predetermined respective operations and means provided in the camera body for controlling the plurality of circuit elements, comprising the steps of:

selecting, by the control means through selecting lines, which circuit element should operate in accordance with predetermined camera operation;

receiving in the control means data from a selected circuit element through a data bus with pulses through a signal line;

calculating by the control means on the basis of data received from a selected circuit element data which should be sent to said circuit element in accordance with predetermined camera operation; and sending from the control means the calculated data through a data bus to a selected circuit element with pulses through a signal line to operate said circuit element.

* * * * *